United States Patent [19]

Skinner

[11] 4,100,607
[45] Jul. 11, 1978

[54] COMPUTER FOR VIDEO TAPE EDITING SYSTEM

[75] Inventor: William D. Skinner, Newport Beach, Calif.

[73] Assignee: Convergence Corporation, Irvine, Calif.

[21] Appl. No.: 765,902

[22] Filed: Feb. 7, 1977

[51] Int. Cl.² .................... G06F 1/00; H04N 5/785
[52] U.S. Cl. ............................... 364/900; 360/14
[58] Field of Search ............... 364/200, 900; 360/14

[56] References Cited

U.S. PATENT DOCUMENTS 4,040,098   8/1977   Beeson et al. .................... 360/14

OTHER PUBLICATIONS

Shimada et al., Automated Video Tape Editing System, Toshiba Review, Oct. 1971, pp. 5–10.
New On-Line Editing System, RCA Broadcast News, No. 160, Dec. 1976, pp. 42–48.
Fujimura et al., An Automatic Video-Tape Editing/Splicing System Using a Process Computer, Journal of the SMPTE, vol. 76, No. 3, Mar. 1967, pp. 169–176.

*Primary Examiner*—Gareth D. Shaw
*Assistant Examiner*—Thomas M. Heckler
*Attorney, Agent, or Firm*—Keith D. Beecher

[57] ABSTRACT

A computer is provided for use with a video tape editing system. The video tape editing system is of the type which performs tape-to-tape editing by transferring selected video information from a first video tape recorder, designated the "playback" video tape recorder, to a second video tape recorder, designated the "record" video tape recorder; or directly from a video camera to a record video tape recorder. The computer of the invention, when used in conjunction with such a video tape editing system, provides precise end insert timing so that both in-and-out editing can be automatically performed. Precision accuracy in the system is maintained without the use of a time code, this being achieved by means of a unique closed loop circuit which counts control track pulses derived from the conventional video cassette tapes which are normally used in present-day video tape recorders. The computer of the invention enables in-and-out edit points to be previewed as many times as desired by the operator. After each preview, the operator can adjust all the parameters of the edit. The computer includes a digital stop watch feature which provides frame-accurate scene duration timing for either the playback or record video tape recorders in the video editing system. Moreover, scenes can be timed from still frame start to still frame stop, or on the fly, if so desired. The computer also provides for an automatic bi-directional tape search in either the playback or record video tape recorders in the video tape editing system.

11 Claims, 14 Drawing Figures

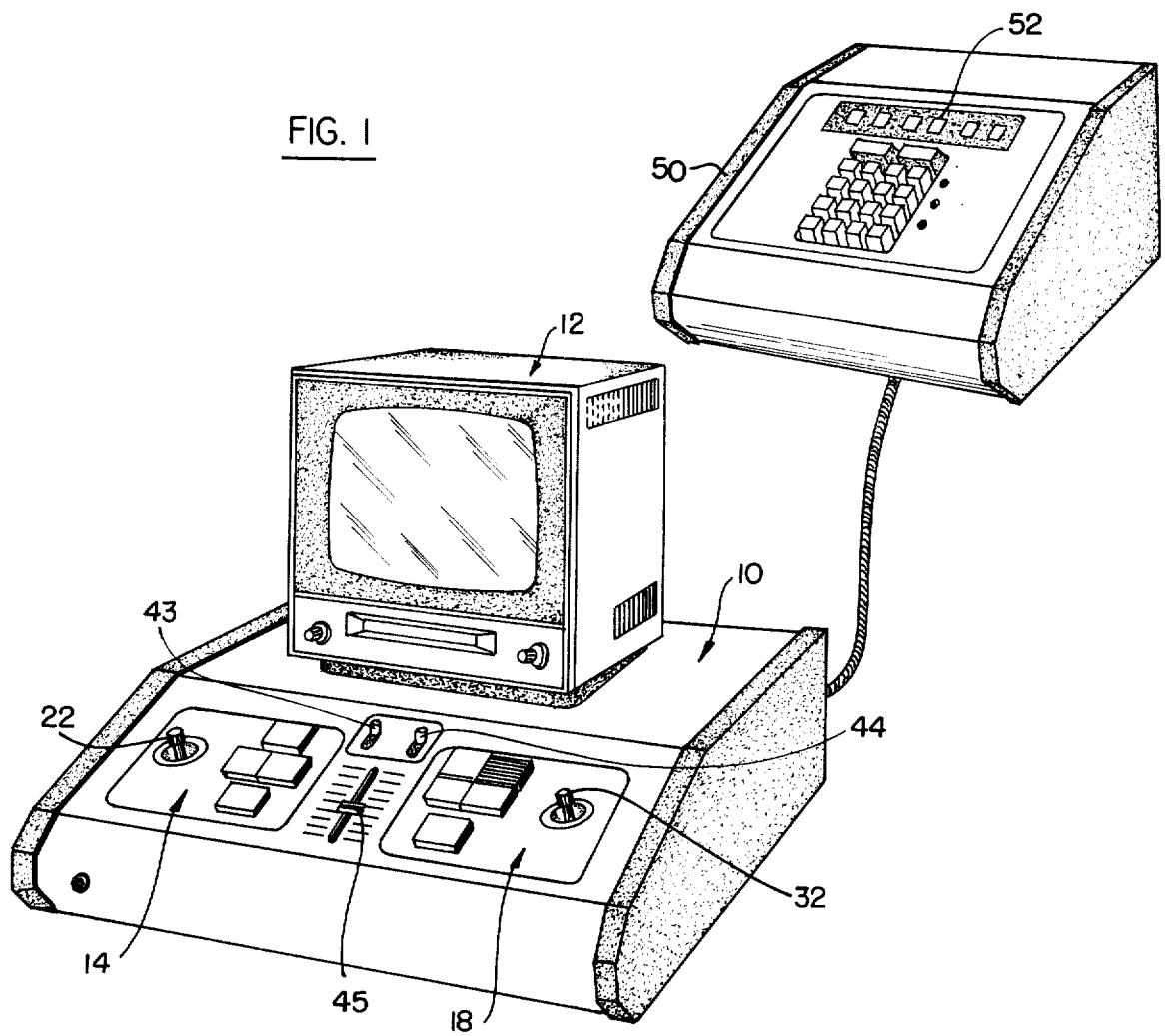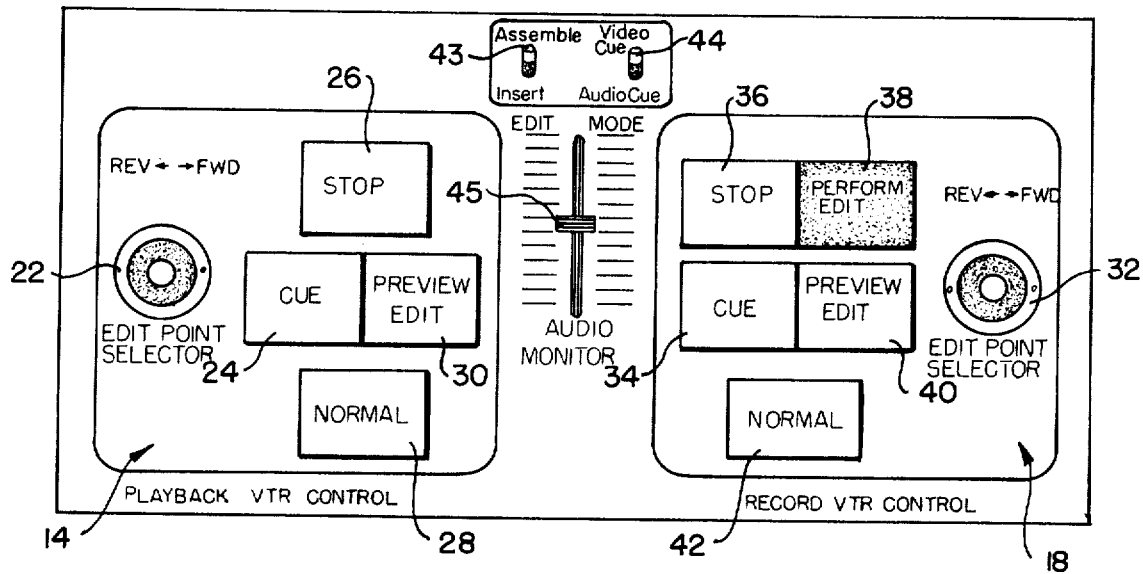

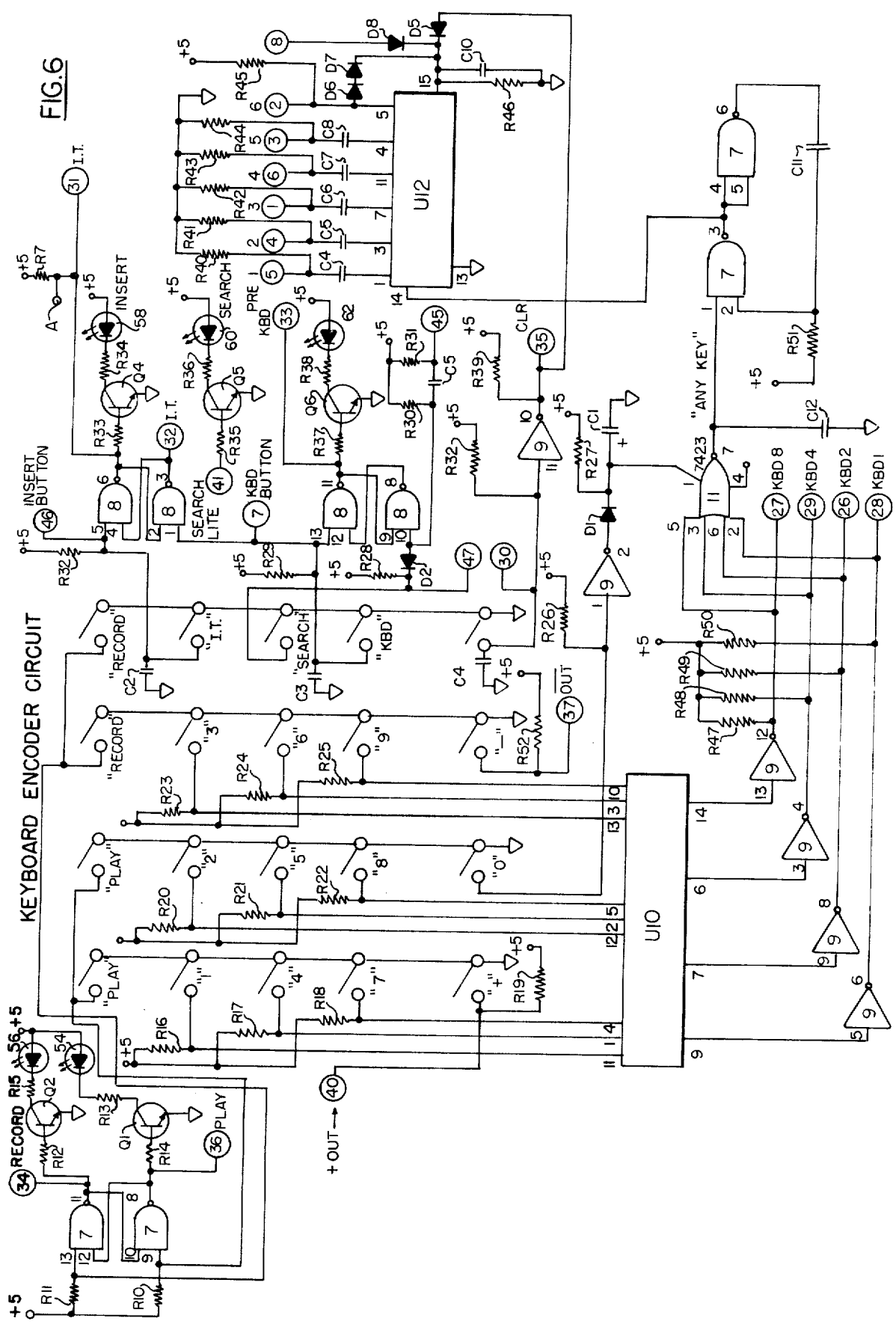

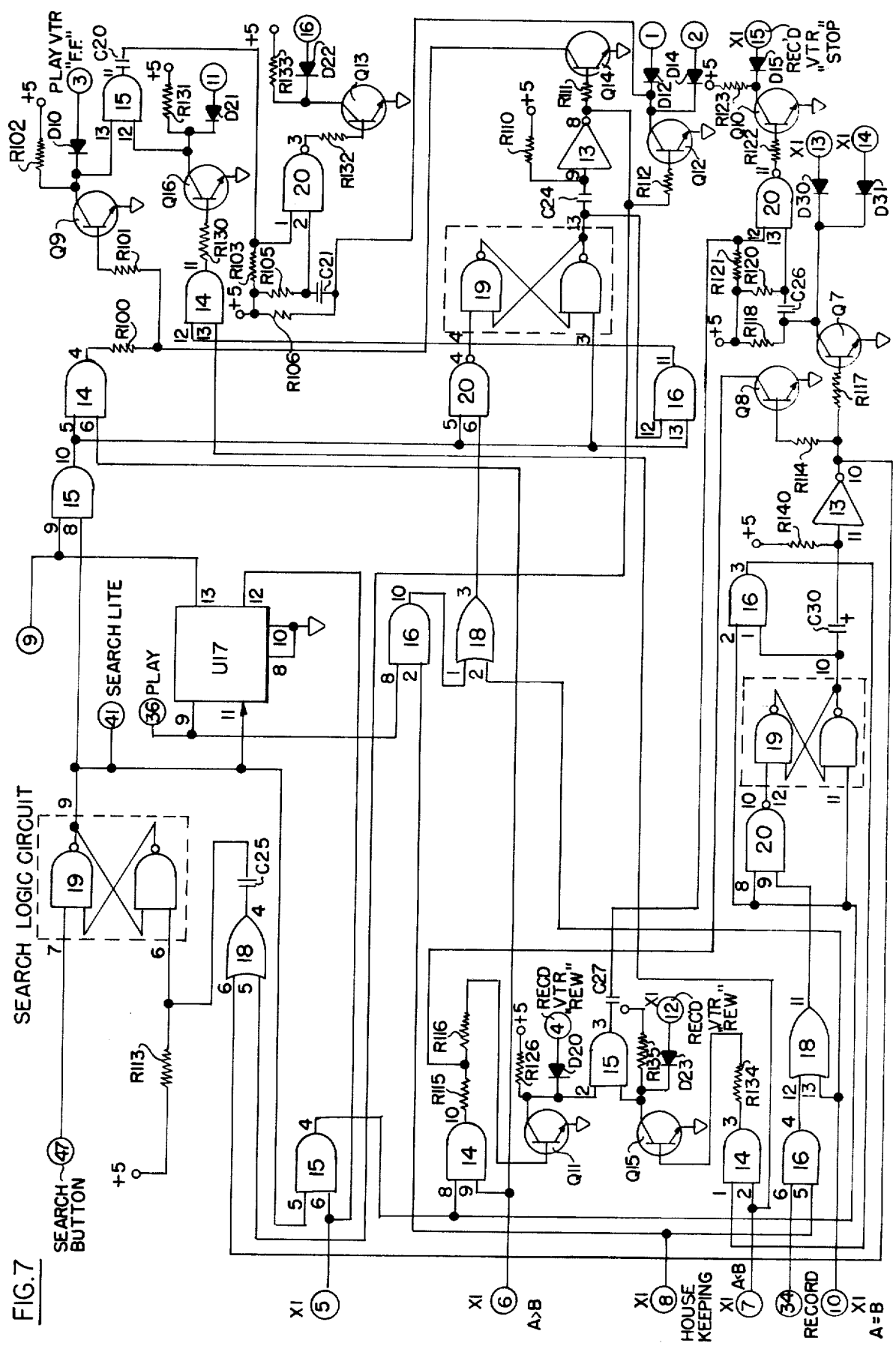

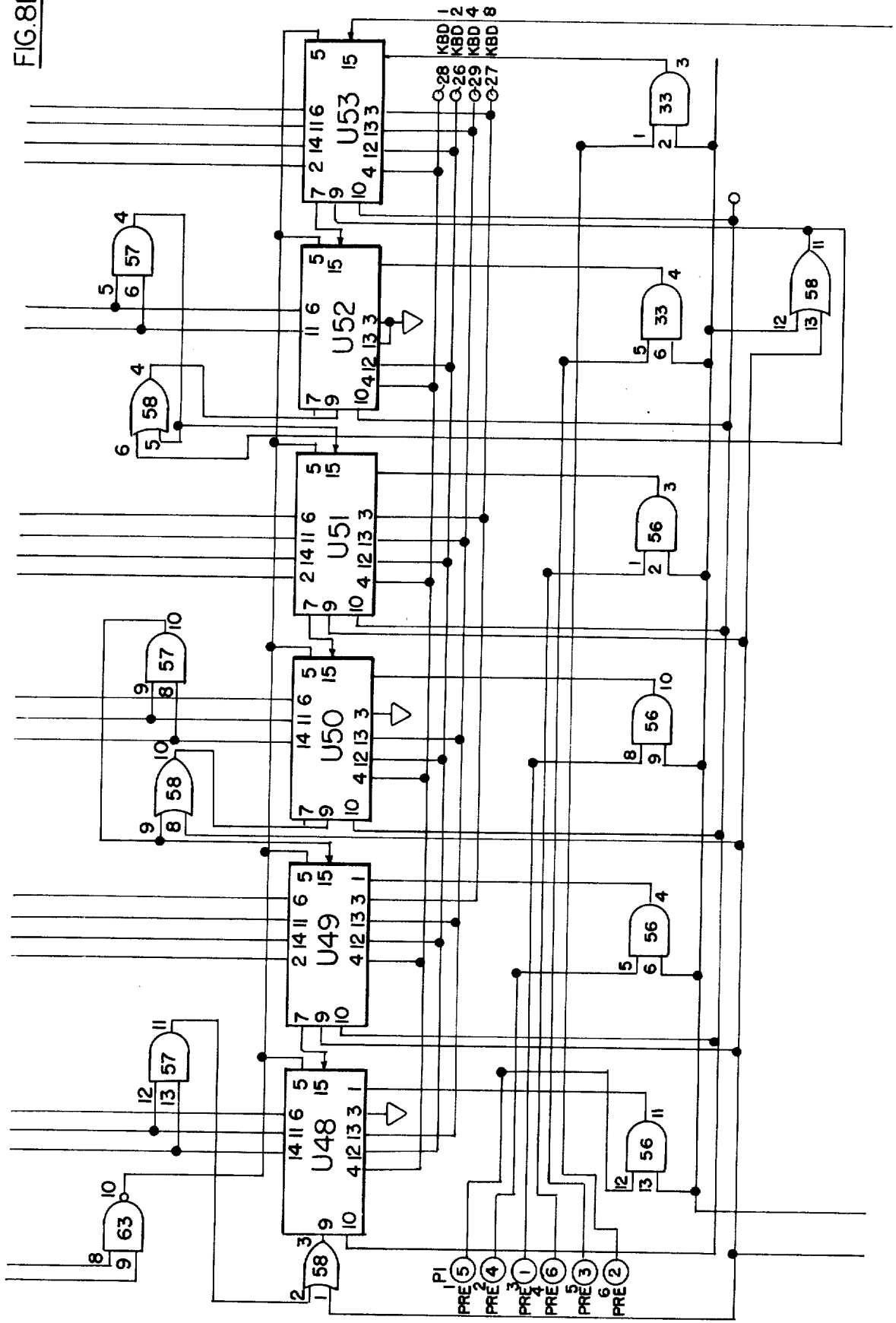

COMPUTER FOR VIDEO TAPE EDITING SYSTEM

BACKGROUND OF THE INVENTION

U.S. Pat. No. 4,040,098, which issued Aug. 2, 1977 discloses a video tape editing system for on-line or off-line editing of a cassette or open-reel helical scan type video tape recorder, or the like. Tape-to-tape editing is carried out in the system by transferring selected video information from a playback video tape recorder to a record video tape recorder; and camera-to-tape editing is carried out in the system by transferring selected video information directly from a video camera to the record video tape recorder. The system described in the patent includes a solid state electronic control for the playback and record video tape recorders, with manually operated joysticks which permit forward and reverse motion of the tapes in the recorders in the vicinity of the edit frames for the precise selection of the edit frames.

The video tape editing system described in the patent fulfills a growing need in the television industry for a practical means to permit accurate and rapid editing of video tapes, so that a finished edited master tape may be assembled from the video information on one or more original tapes, or directly from a video camera. The system described in the patent fulfills the aforesaid needs, in that it is capable of interfacing both the cassette and open-reel types of helical scan video tape recorders for precise tape-to-tape or camera-to-tape editing.

The computer of the present invention, as described briefly above, constitutes an accessory for video tape editing systems, of the type disclosed in the patent, to provide automatic timing and search features, as will be described.

BRIEF DESCRIPTION OF THE DRAWINGS

FIG. 1 is a perspective representation of a video tape editing unit constructed to incorporate the control system described in the copending application, and also of a computer constructed to incorporate the concepts of the present invention, the program computer being electrically connected to the editing unit;

FIG. 2 is a top plan view, on an enlarged scale, of the control panel of the video tape editing unit of FIG. 1;

FIG. 6 is a logic diagram of a keyboard encoding circuit in the computer;

FIG. 7 is a logic diagram of a control circuit in the computer which provides search functions to the tape recorders in the editing system;

FIGS. 8A-8F are logic diagrams of the main circuit in the computer; and

DETAILED DESCRIPTION OF THE ILLUSTRATED EMBODIMENT

Figure 3:
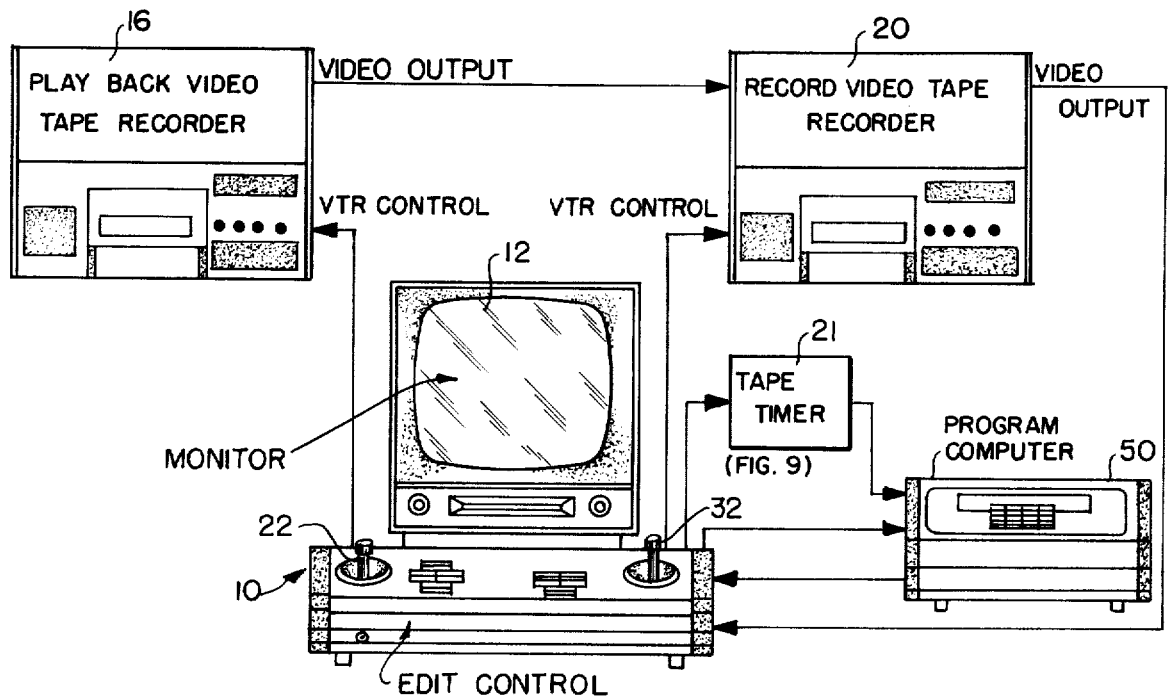
FIG. 3 is a diagrammatic representation of the manner in which tape-to-tape editing may be carried out by the editing control system described in the copending application, under the control of the program computer of the present invention.

The video tape editing unit 10 shown in FIG. 1 includes a base which supports a cathode-ray monitor 12 of any appropriate construction. For example, a nine inch Conrac Video Monitor may be used. The unit 10 includes a first control panel 14 which controls the operation of a playback video tape recorder, such as designated 16 in FIG. 3, and it also includes a second control panel 18 which controls the operation of a record video tape recorder, such as designated 20 in FIG. 3. A tape timer 21 (FIG. 3) which incorporates a timing circuit (FIG. 9) is connected to the video tape editing unit 10.

As best shown in FIG. 2, the control panel 14 includes a joystick potentiometer control 22, and a series of pushbutton switches designated 24, 26, 28 and 30. When the system is switched to a "joystick" mode, the joystick control 22 may be moved to the left or right from a central position to cause the tape in the playback video tape recorder 16 of FIG. 3 to move in the forward or reverse direction from a still-frame position, and at a speed dependent upon the angular displacement of the joystick from its central position. The pushbutton switches 24, 26, 28 and 30 may be of the type which are illuminated when actuated, and they are inscribed respectively as "CUE", "STOP", "NORMAL" and "PREVIEW EDIT".

The control panel 18 includes a joystick control 32 which is similar to the joystick control 22, and which controls the speed and direction of the tape in the record video tape recorder 20 of FIG. 3. The control panel 18 includes a series of pushbutton switches 34, 36, 38, 40 and 42 which, like the pushbutton switches of control panel 14, illuminate when actuated. The latter pushbutton switches are inscribed respectively as "CUE", "STOP", "PERFORM EDIT" and "NORMAL".

When the playback joystick 22 is in its central position, the monitor 12 is caused to monitor the record video tape recorder 20 of FIG. 3. However, when the playback joystick 22 is moved from its central position, the monitor is automatically caused to monitor the playback video tape recorder 16 of FIG. 3. The front panel of the video tape editing unit also includes an "assemble-insert" switch 43 which selects either an "insert" or "assemble" mode in the system. When the switch 43 is set to "insert" a programmable end insert timer is activated to permit inserts of predetermined durations to be made. A "video cue/audio cue" switch 44 is also provided to permit the operator to make a choice as to whether or not the video edit point should be compensated for an audio delay when editing to tight audio cues. A volume control 45 is provided to control the audio monitor volume during preview.

In the representation of FIG. 3, the editing control unit 10 is used to control the transfer of video information from the playback video tape recorder to the record video tape recorder. To operate the video tape editing system for video tape-to-tape recording, "NORMAL" pushbutton switches 28 or 42 (FIG. 2) are actuated to cause the playback video tape recorder and the record video tape recorder to move forward at normal speed. During the "normal" mode, the video information on either the playback of the record video tape recorder may be monitored by the monitor 12.

The "normal" mode continues until the general location on the playback video tape is reached at which information is to be transferred to the record video tape recorder. Then, one or the other of the "STOP" pushbutton switches 26 or 36 (FIG. 2) is actuated to stop the tapes in the recorders, and to place the system in the "joystick" mode of operation, in which the circuits of the joysticks 22 and 32 are activated. The tapes in the playback video tape recorder 16 and in the record video tape recorder 20 may now be individually controlled by the joysticks. During the joystick mode of operation, the monitor 12 monitors the playback video tape recorder so long as the playback joystick 22 is operated. However, as noted above, whenever the joystick 22 is in its central position, and the record joystick 32 is being operated, the monitor is automatically switched to monitor the record video tape recorder.

During the joystick control mode, the "CUE" pushbutton switches 24 and 34 flash to indicate that these switches are to be operated next. When either of the "CUE" pushbutton switches 24 or 34 is depressed, both the playback video tape recorder and the record video tape recorder simultaneously are driven in the reverse direction through a predetermined number of frames, for example, through three hundred frames, to a cue position, at which both tapes stop. The "PREVIEW EDIT" pushbutton switches 30, 40 now flash, indicating that they are to be operated next, and when one or the other of these switches is depressed, both the playback and record video tape recorders simultaneously move forward through the selected edit frame, and on through a predetermined number of frames, for example two hundred frames, beyond the edit frame. Then, the two video tape recorders are automatically stopped and reversed, and are returned through the edit frame back to their original cue positions. The two video tape recorders are then automatically stopped in their original cue positions.

The operation described in the previous paragraph permits a "preview" to be made of the video information on the playback video tape recorder 16 in the vicinity of the edit frame, so that the video information on the video tape on the playback recorder may be observed before the actual transfer to the record video tape is effectuated. At the end of each complete preview cycle, the operator may change the edit frame in either direction by operating the joysticks 22 and 32, and the preview cycle may be repeated by actuating one or the other of the "PREVIEW EDIT" pushbutton switches 30 or 40.

However, if after a complete preview cycle, the edit is acceptable, the operator then presses the "PERFORM EDIT" pushbutton switch 38, and one or the other of the "PREVIEW EDIT" pushbutton switches 30 or 40, and the information from the playback video tape recorder will be transferred to the record video tape recorder automatically, starting precisely at the selected edit frame. During the "preview" and "edit" operations, the monitor 12 monitors the playback video tape recorder.

The operations described above are implemented by means of control circuits described in detail in U.S. Pat. No. 4,040,098.

As shown in FIGS. 1 and 3, a computer 50, constructed in accordance with the concepts of the present invention, is electrically connected to the video tape editing unit 10 and to timer 21. The computer includes a keyboard (FIG. 4), in which, in turn, includes a plurality of keys designated respectively 0-9, +, −, "PLAY", "RECORD", "CLEAR", "INSERT TIME", "SEARCH", "KEYBOARD ENTER". Two indicator lights 54 and 56, in the form of light emitting diodes (LEDS) are mounted adjacent to the respective keys "PLAY" and "RECORD". Three additional indicator lights 58, 60, 62 in the form of light emitting diodes (LEDS), are also mounted on the program computer 50, adjacent to the respective keys "INSERT TIME", "SEARCH" and "KEYBOARD ENTER". A display 52 is also mounted on the computer.

The computer 50 may be operated normally and independently of the video tape editing system, by depressing the "KEYBOARD ENTER" key on the computer. At that time, the light emitting diode 62 is the only function status light illuminated.

The program computer may be used for timing a scene on the record video tape recorder. This is achieved by using the joystick 32 of FIG. 2 to locate and still-frame the beginning of the scene on the record video tape recorder which is to be timed. Then, the "RECORD", "CLEAR" and "INSERT TIME" keys on the computer are depressed. The display 52 will now show six zeros (00:00:00). The "NORMAL" pushbutton switch 42 of FIG. 2 is now actuated to cause the record video tape recorder to move forward in a normal mode. As the video tape in the record video tape recorder is moving forward, the display 52 exhibits the elapsed time in minutes and seconds, and also the elapsed frames. The "STOP" pushbutton switch 36 of FIG. 2 is operated at the end of the scene being timed. This latter operation still-frames the tape in the record video tape recorder, and freezes the time and number of frames on the display 52.

A scene on the playback video tape recorder may be timed in the same manner. However, in this case the "PLAY" key on the computer 50 is depressed, together with the "INSERT TIME" key and the "CLEAR" key. The joystick 22 of FIGS. 1 and 2 is now used to control the video tape in the playback video tape recorder to locate and still-frame the beginning of the scene being timed. The display 52 will now show six zeros, as before. The "NORMAL" pushbutton switch 28 of FIG. 2 is now operated to cause the video tape in the playback video tape recorder to move normally in the forward direction, and again the display 52 records the elapsed minutes and seconds, as well as the elapsed frames. The "STOP" pushbutton switch 26 is operated at the end of the scene being timed, which will still-frame the tape in the playback video tape recorder and freeze the time on the display.

The program computer of the invention may also be used to effectuate certain pre-roll cue procedures. The following discussion will be divided into four parts corresponding to four different relative positions of the playback and record tapes immediately after the in-and-out edit points have been selected, and after the insert duration time has been determined.

The first procedure to be considered will be that of cueing both the video tape recorders from the beginning of a record scene/beginning of a playback scene. In this case both tapes are positioned at the "in edit" points by means of the joysticks 22 and 32 of FIG. 2. The insert duration time in this instance has usually been determined at some other time and written on a scene log or edit decision list. To properly cue both video tape recorders for this type of edit, the operator depresses the "KEYBOARD ENTER" key of FIG. 4, and actuates either "CUE" pushbutton switch 24 or 34 in FIG. 2, to obtain the five second pre-roll cue on both video tape recorders.

Figure 4:
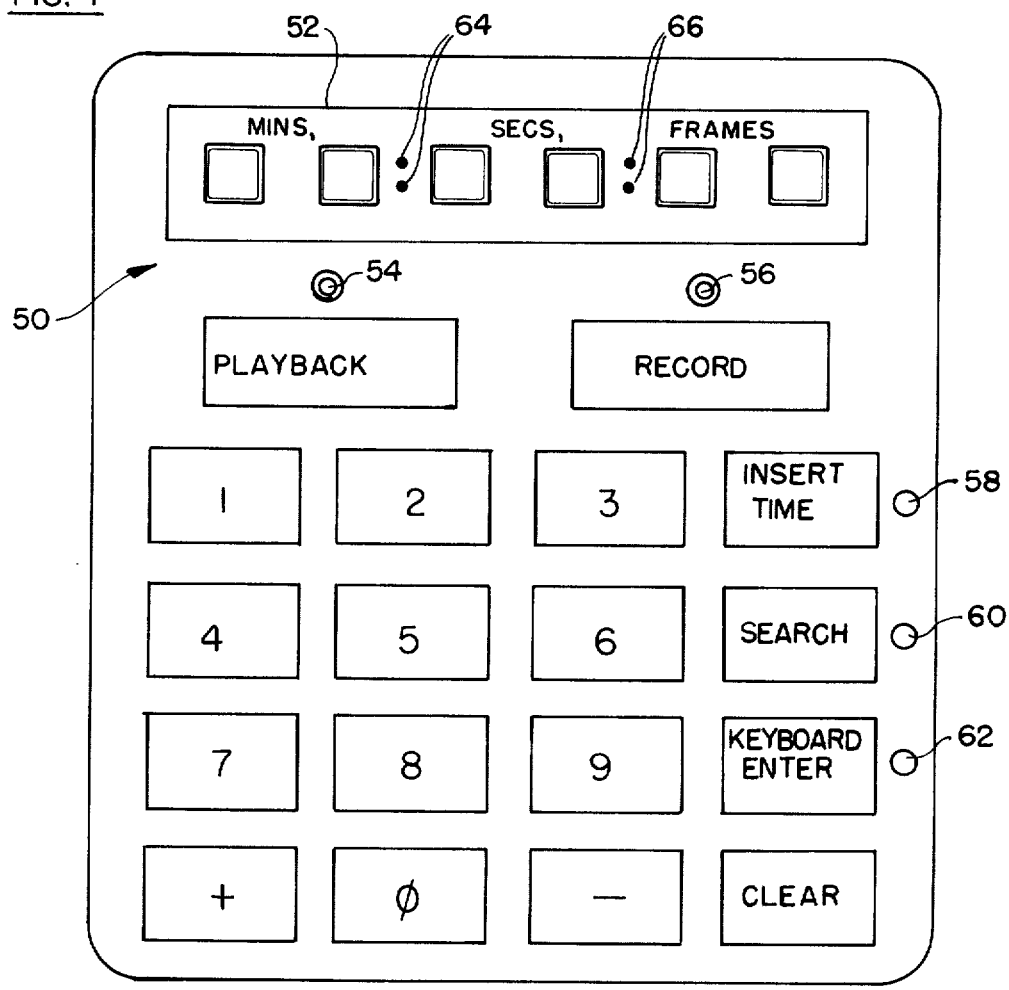
FIG. 4 is a top plan view, on an enlarged scale, of the keyboard of the computer of FIG. 1.

The operator then enters the known insert duration time on the computer 50 by depressing the "INSERT TIME" key and the "CLEAR" key of FIG. 4, and by then depressing the appropriate number keys until the desired six-digit number appears on the display 42. Digits are entered on the display from the left. Trailing zeros need not be entered as they are entered automatically by the computer. At this point the operator is ready to preview the trim, or perform the desired edit, as will be described subsequently.

A second cue procedure is that of cueing both video tape recorders from the end of the record scene/beginning of the playback scene. In this case the insert duration time is determined by timing the scene on the record video tape recorder by means of the procedure described above. The tapes are physically positioned at the last frame of the scene just timed on the record video tape recorder and at the first frame of the new scene on the playback video tape recorder. To properly cue both video tape recorders for this type of edit, the computer has the desired six-digit insert duration time displayed by the display 52. The LED indicator 56 over the "RECORD" key of FIG. 4 is illuminated along with the LED indicator 58 beside the "INSERT TIME" key. The operator then depresses either "CUE" pushbutton switch 24 or 34 of FIG. 2, to cause both the video tape recorders automatically to cue back the proper amount. That is, the record video tape recorder will cue back the insert duration time shown in the display plus the normal five second cue duration of the video tape editing system. Since the playback video tape recorder is at the beginning of a new scene to be inserted, it will cue back only the normal five second cue duration of the video tape editing system. At this time the system is now ready actually to preview, trim or perform the desired edit, as will be described.

The third pre-roll cue procedure which may be carried out by the computer is that involving cueing both video tape recorders from the beginning of a record scene/end of a playback scene. In this case the insert duration time is previously determined by timing the scene on the playback video tape recorder by the procedure described above. Both the playback and record tapes are physically positioned at the first frame of the scene being replaced on the record video tape recorder and at the last frame of the scene just timed on the playback video tape recorder. To cue both video tape recorders properly for this type of edit, the computer 50 has the desired six digit insert duration display on the display 52 of FIG. 4. The LED indicator 54 over the "PLAY" key is now illuminated, along with the LED indicator 58 beside the "INSERT TIME" key.

The "CUE" pushbutton switch 24 or 34 of FIG. 2 is then depressed, so that both video tape recorders automatically cue back the appropriate amount. In this case, since the record video tape recorder is at the beginning of the scene to be replaced, it will cue back only the normal five second cue duration of the video tape editing system. However, since the playback video tape recorder is at the end of the new scene being inserted, it will cue back the insert duration time shown on the display 52 plus the normal five second cue duration of the video tape editing system. At this point, the system is ready actually to preview, trim and perform the desired edit, as will be described subsequently.

A fourth pre-roll cue procedure involves cueing both the video tape recorders 16 and 20 from the end of the record scene/end of the playback scene. In this case the insert duration time is determined on either the record or playback video tape recorder, and the other video tape recorder is used to time a matching scene to fit the desired insert duration. Both tapes are physically positioned at the end of their respective scenes. To properly cue both video tape recorders, the computer 50 has the desired six-digit insert duration time displayed by the display 54 of FIG. 4. The LED indicator 58 beside the "INSERT TIME" key is now illuminated. The operator then depresses both "PLAY" and "RECORD" keys in FIG. 4, and holds the keys actuated for a full cue duration until both video tape recorders stop cueing back. The cueing back operation is initiated by depressing either "CUE" pushbutton switch 24 or 34 of FIG. 2 while holding down both the "PLAY" and "RECORD" keys on the computer 50 of FIG. 4. Both video tape recorders 16 and 20 of FIG. 3 will automatically cue back the normal five second cue duration of the video tape editing system, plus the insert duration shown on display 50 of FIG. 4. At this time, the system is ready actually to preview, trim and perform the desired edit, which operations will now be described.

Once both the video tape recorders 16 and 20 of FIG. 3 have been properly cued in any one of the four operations described above, the operator may now preview the in-and-out edit points in real time by setting the insert/assemble switch 43 of FIG. 3 to the "insert" position, and by selecting the proper combination of insert signal switches on the record video tape recorder 20 of FIG. 3. Either "PREVIEW EDIT" pushbutton switch 30 or 40 in FIG. 2 is then depressed. The latter operation causes both video tape recorders 16 and 20 of FIG. 3 to move forward through a real time to perform a preview of the insert edit. The tapes will proceed three seconds beyond the "out" edit point to show aesthetic continuity, and they will, then automatically re-cue to the proper pre-roll cue position without any action required by the operator. This preview procedure may be repeated as many times as desired.

After a preview, the operator may choose to adjust or trim one or all of the edit points. All keyboard trimming must be performed after both video tape recorders have been cued, otherwise, the "in" edit point will be shifted instead of the "out" edit point. The "in" edit points on either video tape recorder 16 or 20 of FIG. 3 can be adjusted by manipulation of the respective joysticks 22 or 32 of FIGS. 1 and 2.

It should be noted that adjusting the "in" edit point with a joystick will also shift the "out" edit point on the particular video tape recorder. If it is desired to leave the "out" edit point unchanged, it is necessary to trim the insert duration with the computer keyboard of FIG. 4 an amount corresponding to the joystick shift of the "in" edit point. This can be accomplished as follows. To shift the "out" edit point, either the + key or the − key of the keyboard of FIG. 4 is depressed. The + key is depressed for longer insert duration, and the − key for shorter insert duration. The numerical keys, corresponding to the number of frames to be added to or subtracted from the insert duration shown in the display, are then depressed. If the trim number is less than ten frames, it will be necessary to enter a zero first, and then the single digit number. The "INSERT TIME" key is then depressed to up-date the display. The time duration will always match the number shown on the display 52 when the LED indicator 58 beside the "INSERT TIME" key is illuminated.

The trim feature is particularly useful in compensating for human reaction time and tape coasting at the end of timing a scene. Generally, there is a predictable lag of 1/5 – 1/3 seconds (6–10 frames) between when the operator perceives the desired "out" edit point, and when his finger depresses the "STOP" pushbutton switch 26 or 36 of FIG. 2. The tape will also coast an additional 3-4 frames before stopping after the stop button has been depressed. For these reasons, it is generally preferable that −9 to −12 frames be trimmed out of the insert duration time after both video tape recorders have been properly cued, in accordance with the operations described above.

After the display has been trimmed, the trim edit may then be previewed in accordance with the preview procedure described above, or an insert edit operation may be performed. The insert edit operation is performed by actuating the "PERFORM EDIT" pushbutton switch 38 of FIG. 2, and either "PREVIEW EDIT" pushbutton switch 30 or 40. Both video tape recorders will now move simultaneously forward and the editing system will perform the desired edit. After the "out" edit at the end of the insert duration, the operator depresses the "PERFORM EDIT" pushbutton switch 38 to cancel the perform edit mode on the video tape editing system, and he depresses both the "STOP" pushbutton switches 26 and 36 of FIG. 2 to still-frame the tapes on both video tape recorders.

The operator is now prepared to joystick the record tape back to just prior to the insert edit and cause it to move through the finished edit for a quick quality check, by actuating either "NORMAL" pushbutton switch 28 or 42 of FIG. 2.

To cause the computer 50 to perform an automatic bidirectional tape search in fast forward and rewind, on either the playback video tape recorder 16 or the record video tape recorder 20 in FIG. 3, the "PLAYBACK" or "RECORD" key on the computer 50 (FIG. 4) is depressed, and the "CLEAR" key is also depressed. The appropriate four-digit number in minutes and seconds is entered on the display 52 by the operation described above. The "SEARCH" key is then depressed.

The selected video tape recorder will now unthread and search in fast forward or rewind to find a match between the number on the display 52 of FIG. 4 and the tape timer display. When the match is achieved, the selected video tape recorder will automatically thread and assume the joystick pause mode awaiting for the operator to home in on the exact frame desired by actuating the appropriate joystick 22 or 32. Minor overshoots or under-shoots of approximately one second are normal since the search function is designed only to locate general scene areas in accordance with a prewritten scene log. Specific video cues should be included in the log to enable the operator to home in on the particular frame by the joystick 22 or 32 of FIG. 1.

It is possible to search on one video tape recorder while timing a scene on the other. To save time, an operator would typically automatically search the playback video tape recorder 16 with the computer 50 for the next scene from the master program material while timing the next scene to be replaced on the record video tape recorder. To cancel a search operation at any time, it is merely necessary for the operator to depress the "CLEAR" key of the computer (FIG. 4). This will cause the searching video tape recorder immediately to stop, thread and assume the joystick pause mode awaiting the next operation.

Figure 5:
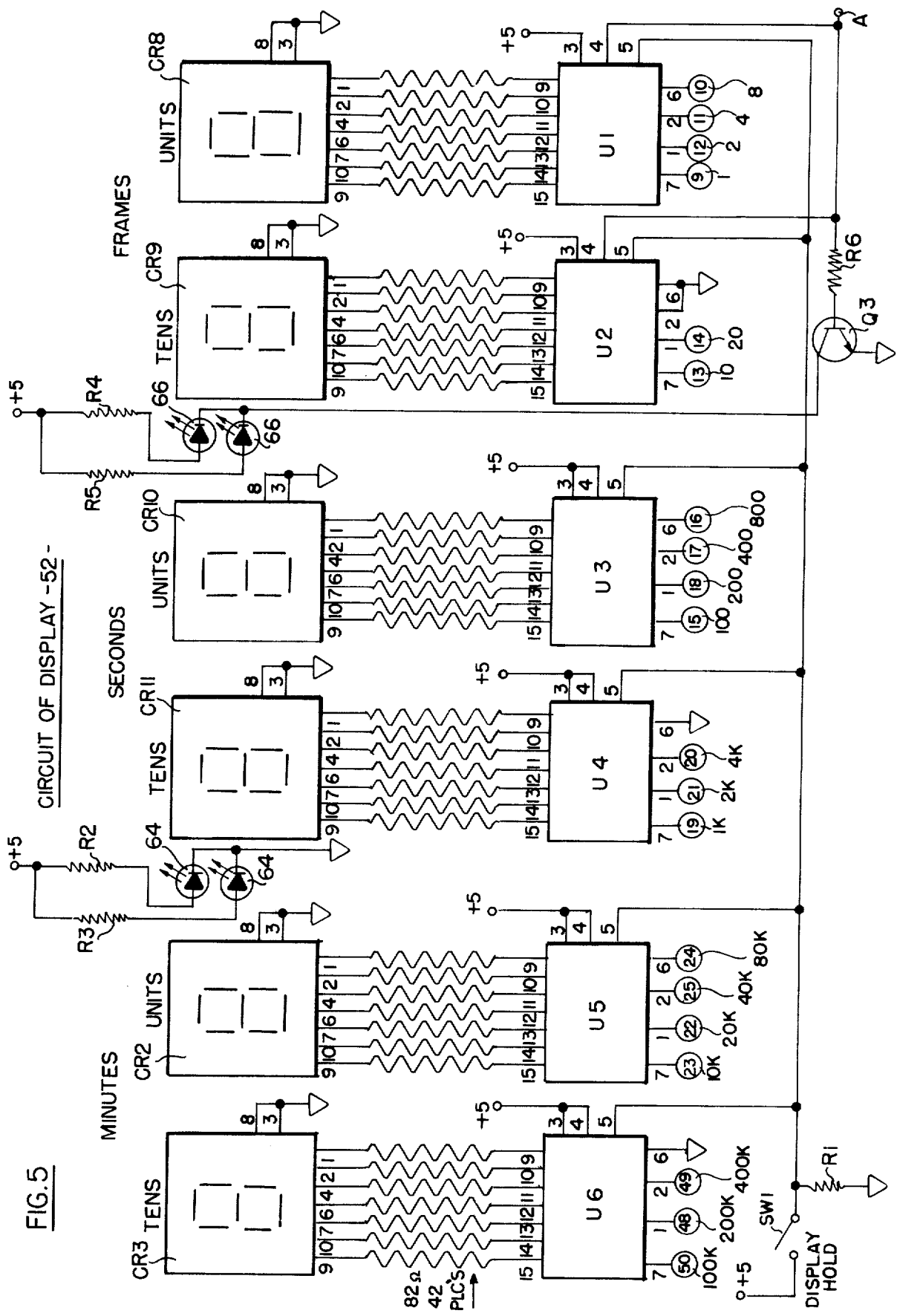
FIG. 5 is a diagram of the circuitry associated with a display on the computer.

The circuit of display 52 of FIG. 5 is made up of six commercially available LED units CR8-CR13 which are driven by respective decoder drivers U1-U6. The LED units each is capable of displaying digits 0-9, and each may be of the type presently designated FND500. The decoder drivers are BCD-decimal decoders, and may take the form of CMOS latches of the type presently designated 4511. The LED units CR8 and CR9 display the units and tens digits of the "frames" display; the LED units CR10 and CR11 display the units and tens digits of the "seconds" display; and the LED units CR12 and CR13 display the units and tens digits of the "minutes" display. The BCD information is fed to the decoder drivers U1-U6 from the logic storage memory of FIG. 8D.

All BCD commands fed to the decoder drivers in the illustrated embodiment of the invention are positive true logic. This applies to all logic commands that exist within the computer. That is, a high level represents a "one" or "true" state.

Pin #5 of each decoder driver U1-U6 is connected to a grounded 15 kilo-ohm resistor R1 and to a switch SW1. The switch SW1 is connected to the positive terminal of a 5-volt direct voltage source. The switch SW1 provides a display hold feature which is used to permit the operator to record the displayed data.

The colons 64 and 66 (FIG. 4) are formed by corresponding LED's in FIG. 5. The LED's forming colon 64 are connected to ground and to the positive terminal of the 5-volt source through respective 220 ohm resistors R2 and R3, and are continuously energized. The LED's forming the colon 66 are connected to the collector of a transistor Q3, and through respective 220 ohm resistors R4 and R5 to the positive terminal of the 5-volt source. The emitter of transistor Q3 is grounded, and the base is connected through a 20 kilo-ohm resistor R6 to pin 4 of each of the decoder drivers U1 and U2, and through a 10 kilo-ohm resistor R7 (FIG. 6) to the positive terminal of the 5-volt source. The latter colon is illuminated only when the displays CR8 and CR9 are activated.

The basic input/output functions of the computer of the invention are performed by the keyboard encoder circuit of FIG. 6. In that circuit the "PLAYBACK" keys are connected to pin 9 of integrated circuit 7 and to a 15 kilo-ohm resistor R10 which, in turn, is connected to the positive terminal of the 5-volt source. The "RECORD" keys are connected to pin 13 of integrated circuit 7 and to a 15 kilo-ohm resistor R11 which, likewise, is connected to the positive terminal of the 5-volt source.

Pin 11 of integrated circuit 7 is cross-connected to pin 10, and pin 12 is cross-connected to pin 8. Pin 11 is also connected to a terminal 34 (designated "RECORD"), and through a 15 kilo-ohm resistor R12 to the base of an NPN transistor Q2. Pin 8 of integrated circuit 7 is connected to a terminal 36 (designated "PLAY"), and through a 15 kilo-ohm resistor R14 to the base of an NPN transistor Q1. The emitters of transistors Q1 and Q2 are grounded. The collector of transistor Q1 is connected through a 220 ohm resistor R13 to LED 54 which, in turn, is connected to the positive terminal of the 5-volt source. The collector of transistor Q2 is connected through a 220 ohm resistor R15 to LED 56 which, likewise, is connected to the positive terminal of the 5-volt source.

The common terminals of all the keys of the keyboard are grounded. Numeral keys 1, 4 and 7 are connected to pins 11, 1 and 4 respectively of an integrated circuit U10 which may be of the type designated 74147. Key 1 is also connected through a 10 kilo-ohm resistor R16 to the positive terminal of the 5-volt source; key 4 is connected through a 10 kilo-ohm resistor R17 to that terminal, and key 7 is connected through a 10 kilo-ohm resistor R18 to that terminal. The "+" key is connected to a terminal 40 (designated "OUT"), and through a 15 kilo-ohm resistor R19 to the positive terminal of the 5-volt source. The "−" key is connected to a terminal 37 (designated OUT). The "+" and "−" keys are not encoded, and are used only for the trim command in the main logic circuit of FIG. 8F.

Likewise, the numeral keys 2, 5 and 8 are respectively connected to pins 12, 2 and 5 of integrated circuit U10, and through respective 10 kilo-ohm resistors R20, R21 and R22 to the positive terminal of the 5-volt source; and numeral keys 3, 6 and 9 are connected to respective pins 13, 3 and 10 of integrated circuit U10, and through respective 10 kilo-ohm resistors R23, R24 and R25 to the positive terminal of the 5-volt source.

The numeral key "0" is connected to pin 1 of integrated circuit 9 and through a 10 kilo-ohm resistor R26 to the positive terminal of the 5-volt source. Pin 2 of integrated circuit 9 is connected through diode D1 to pin 1 of integrated circuit 11, which may be of the type designated 7423. The diode D1 is also connected to a grounded 3.3 microfarad capacitor C1, and through a 15 kilo-ohm resistor R27 to the positive terminal of the 5-volt source.

The "INSERT TIME" key (I.T.) is connected to a grounded 1 microfarad capacitor C2, the "KEYBOARD ENTRY" key (KBD) is connected to a grounded 10 microfarad capacitor C3, and the "CLEAR" key is connected to a grounded 10 microfarad capacitor C4. The "SEARCH" key is connected to a terminal 47 designated "SEARCH BUTTON", to the cathode of a diode D2, and through a 15 kilo-ohm resistor R28 to the positive terminal of the 5-volt source. The "KEYBOARD ENTRY" key is also connected through a 15 kilo-ohm resistor R29 to the positive terminal of the 5-volt source, and to pin 13 of integrated circuit 8. The anode of diode D2 is connected to pin 10 of integrated circuit 8, and to a 0.1 microfarad monolithic capacitor C5, and through a 15 kilo-ohm resistor R30 to the positive terminal of the 5-volt source. Capacitor C5 is connected to a terminal 45 designated "KEYBOARD RESET", and through a 20 kilo-ohm resistor R31 to the positive terminal to the 5-volt source.

Pin 13 of integrated circuit 8 is also connected to a terminal 7 designated "KEYBOARD BUTTON", and to pin 1 of integrated circuit 8. The insert time key is also connected to pin 5 of integrated circuit 8 and to a terminal 46 designated "INSERT BUTTON", as well as through a 15 kilo-ohm resistor R32 to the 5-volt source.

Pin 6 of integrated circuit 8 is cross-connected to pin 2, and pin 3 of integrated circuit 8 is cross-connected to pin 4. Pin 3 is also connected to a terminal 32 designated "I.T.". Pin 6 of integrated circuit 8 is also connected to an output terminal 31 designated "I.T.", and through resistor R7 to the positive terminal of the 5-volt source.

Pin 6 of integrated circuit 8 is also connected through a 15 kilo-ohm resistor R33 to the base of an NPN transistor designated Q4. The emitter of transistor Q4 is grounded, and the collector is connected through a 220 ohm resistor R34, and through LED 58 to the positive terminal of the 5-volt source.

Terminal 41 is connected through a 15 kilo-ohm resistor R35 to the base of an NPN transistor Q5. The emitter of transistor Q5 is grounded, and the collector is connected through a 220 ohm resistor R36, and through LED 60 to the positive terminal of the 5-volt source.

Pin 11 of integrated circuit 8 is cross-connected to pin 9, and pin 8 is cross-connected to pin 12. Pin 11 is also connected to a terminal 33 desiganted "KBD", and through a 15 kilo-ohm resistor R37 to the base of an NPN transistor Q6. The emitter of transistor Q6 is grounded, and the collector is connected through a 220 ohm resistor R38, and through LED 62 to the positive terminal of the 5-volt source.

The "SEARCH" key is also connected to a terminal 47 designated "SEARCH BUTTON", and the "CLEAR" key is also connected to a terminal 30 designated "CLR" and to pin 11 of integrated circuit 9 as well as through a 15 kilo-ohm resistor R32 to the positive terminal of the 5-volt source. Pin 10 of integrated circuit 9 is connected to a terminal 35 designated "CLR", and through a 4.7 kilo-ohm resistor R39 to the positive terminal of the 5-volt source. Pin 10 of integrated circuit 9 is also connected through diode D5 to pin 15 of integrated circuit U12. Integrated circuit U12 may be of the type designated 4022.

Pins 1, 3, 7, 11 and 4 of integrated circuit U12 are connected to respective 0.1 microfarad monolithic capacitors C4, C5, C6, C7 and C8. The capacitors are connected to respective terminals 5, 4, 1, 6, 3 and 2 designated respectively "PRE 1, 2, 3, 4, 5 and 6". The capacitors are also connected to respective grounded 47 kilo-ohm pull-down resistors R40, R41, R42, R43 and R44. Pin 5 of integrated circuit U12 is connected to terminal 2, and to a 20 kilo-ohm resistor R45 which, in turn, is connected to the positive terminal of the 5-volt source. Pin 5 is also connected through diodes D6 and D7 to pin 15. Pin 15 is connected to a 20 kilo-ohm grounded resistor R46 which is shunted by a 0.1 microfarad capacitor C10. Pin 15 is also connected through diode D8 to terminal 8 designated "6, 8 PRE CNTR RESET".

Pins 9, 7, 6 and 14 of integrated circuit U10 are connected respectively to pins 5, 9, 3 and 13 of integrated circuit 9. Pins 6, 8, 4 and 12 of integrated circuit 9 are connected to terminals 28, 26, 29 and 27 respectively, designated KBD1, KBD2, KBD4, KBD8. The last-named pins are also connected to respective 4.7 kilo-ohm resistors R47, R48, R49 and R50 to the positive terminal of the 5-volt source. The aforesaid pins are also connected to pins 2, 6, 3 and 5 respectively of integrated circuit 11. Pin 7 of integrated circuit 11 is connected to pin 1 of integrated circuit 7. Pin 2 of integrated circuit 7 is connected through a 20 kilo-ohm resistor R51 to the positive terminal of the 5-volt source, and to a 3.3 microfarad capacitor C11. Pin 7 of integrated circuit 11 is also connected to a 3.3 microfarad grounded capacitor C12. Pin 3 of integrated circuit 7 is connected to pin 14 of integrated circuit U12, and to pins 4 and 5 of integrated circuit 7.

The various integrated circuits in FIG. 6 are designated by conventional logic symbols. Specifically, R/S latches, inverters, "or" gates, "and" gates, inverters and "nand" gates. In the diagram, the R/S latches are of the type presently designated 4044; the inverters are of the type presently designated 4069; the "or" gates are of the type presently designated 4071; the "and" gates are of the type presently designated 4081; the inverters are of the type presently designated 7404 (TTL); and the "nand" gates are of the type presently designated 74C00 (CMOS). The diodes are of the type presently designated IN4148, and the NPN transistors are of the type presently designated 2N3565.

Any numeral key 1-9, when depressed, develops a pulse at the output of integrated circuit gate 11, pin 7. This pulse is designated "ANY KEY COMMAND", and it is used to clock the integrated circuit U12 to develop one or more of the pre-commands 1-6. The pre-commands 1-6 are used to enable the main logic circuit of FIG. 8D to load the numeral characters in the proper sequence. These pre-commands appear at terminals 5, 4, 1, 6, 3 and 2 respectively. Simultaneously, outputs from pins 6, 8, 4 and 12 of integrated circuit 9 appear at terminals 28, 26, 29 and 27, which are designated "KBD1, 2, 4 and 8", are also developed when the various numeral keys are depressed. These commands are BCD encoded, and are used to develop numeric information fed to the main logic circuit of FIG. 8E.

Figure 8A:
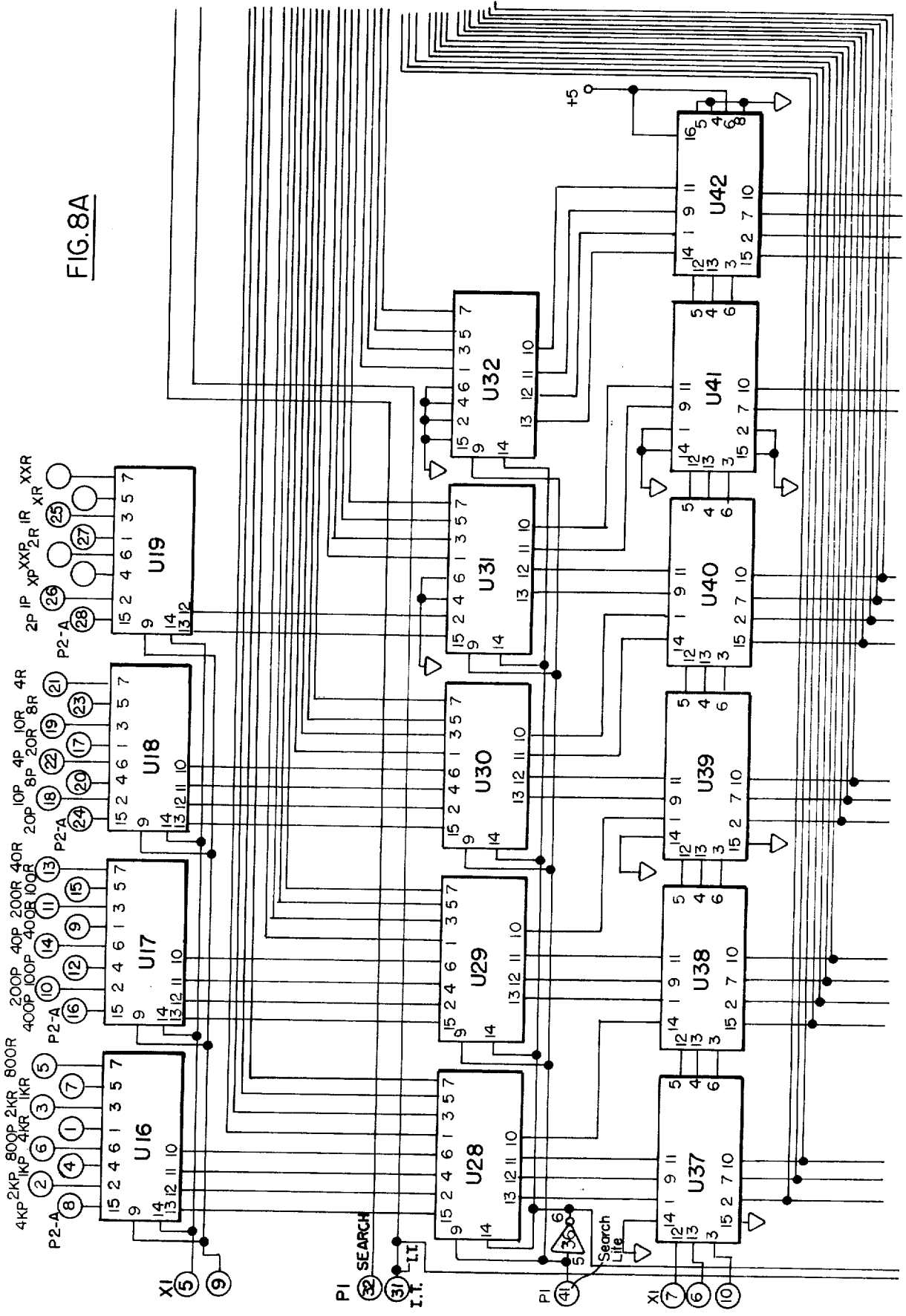
Figure 8C:
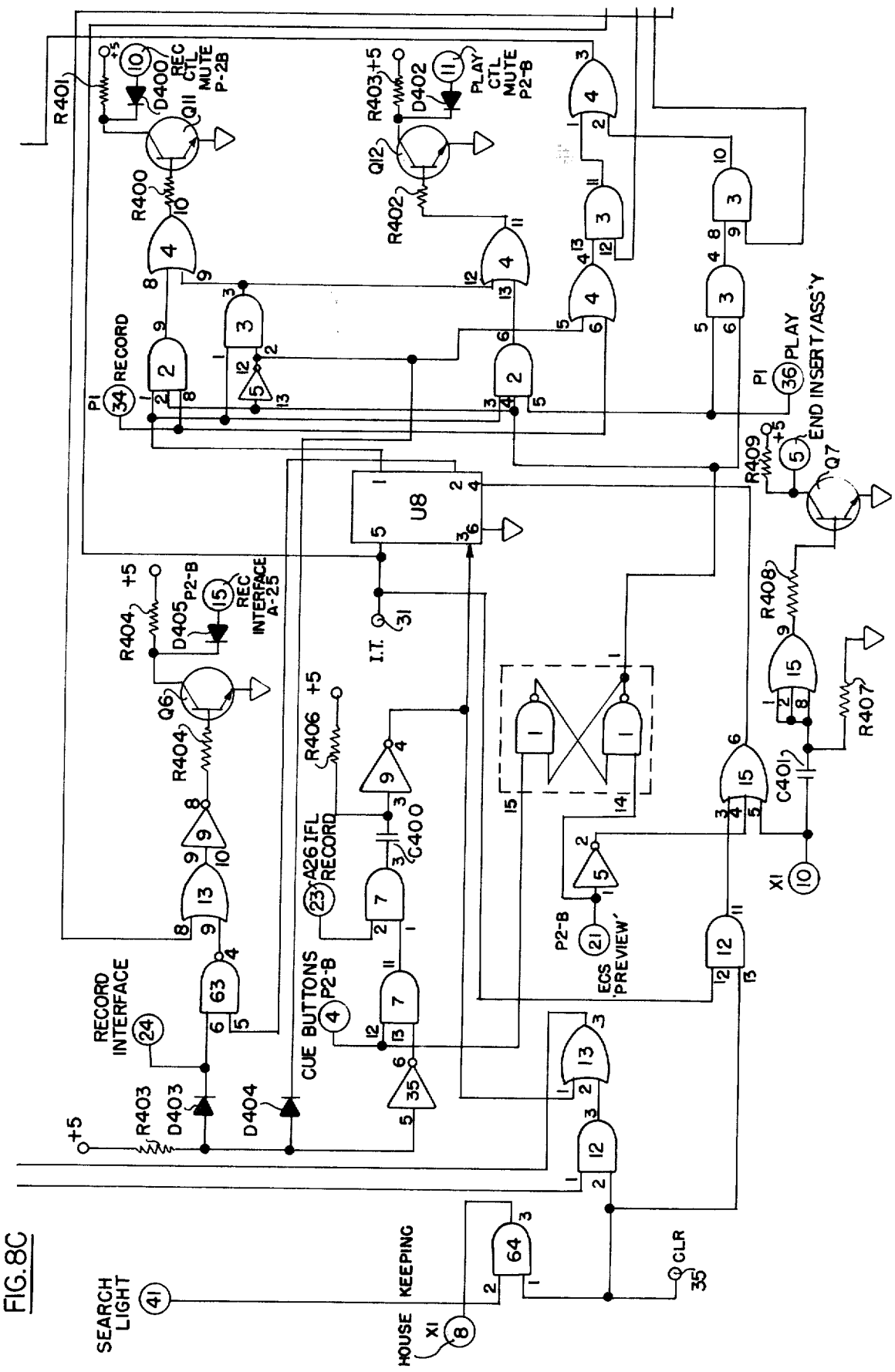
Figure 8D:
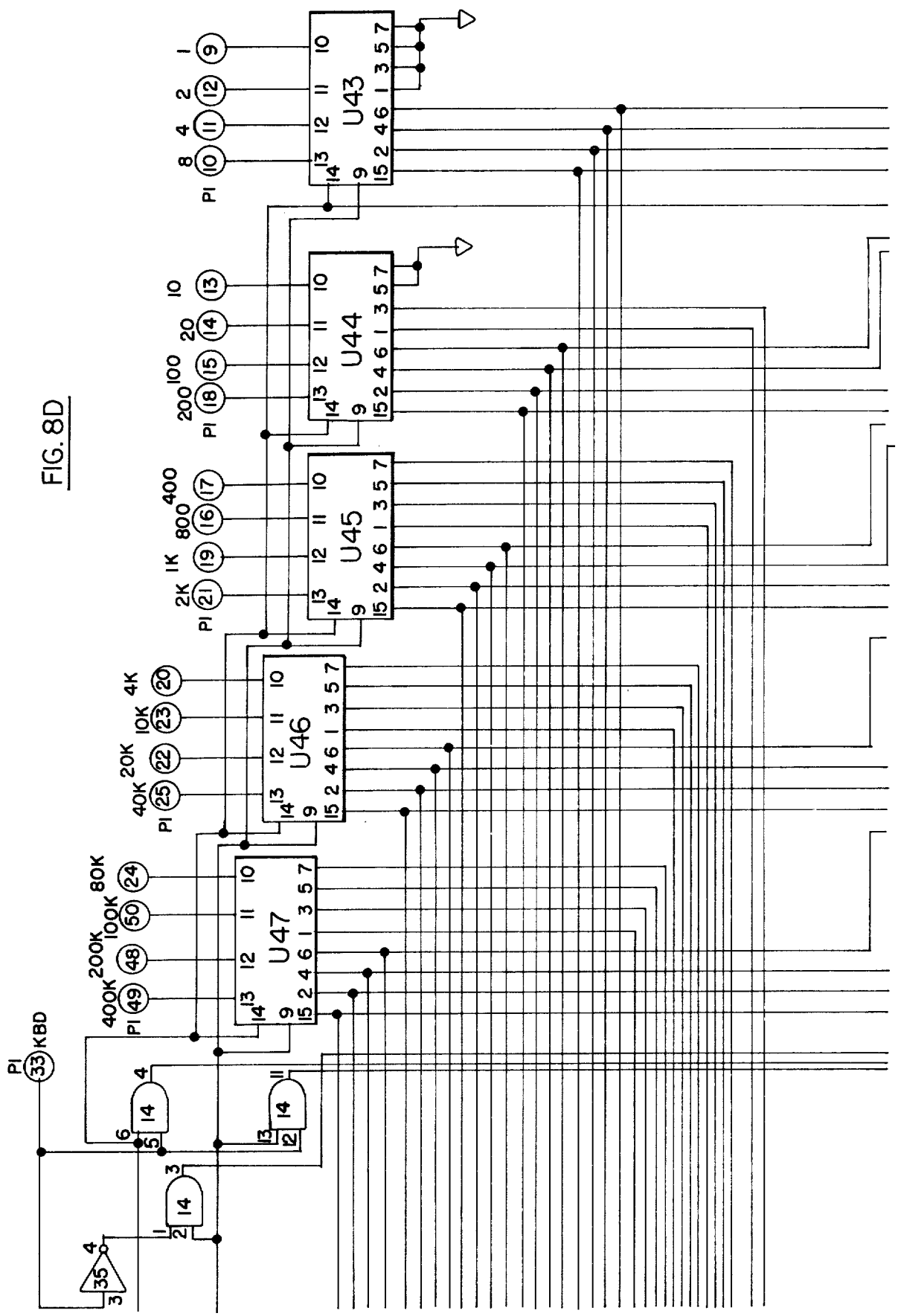
Figure 8E:
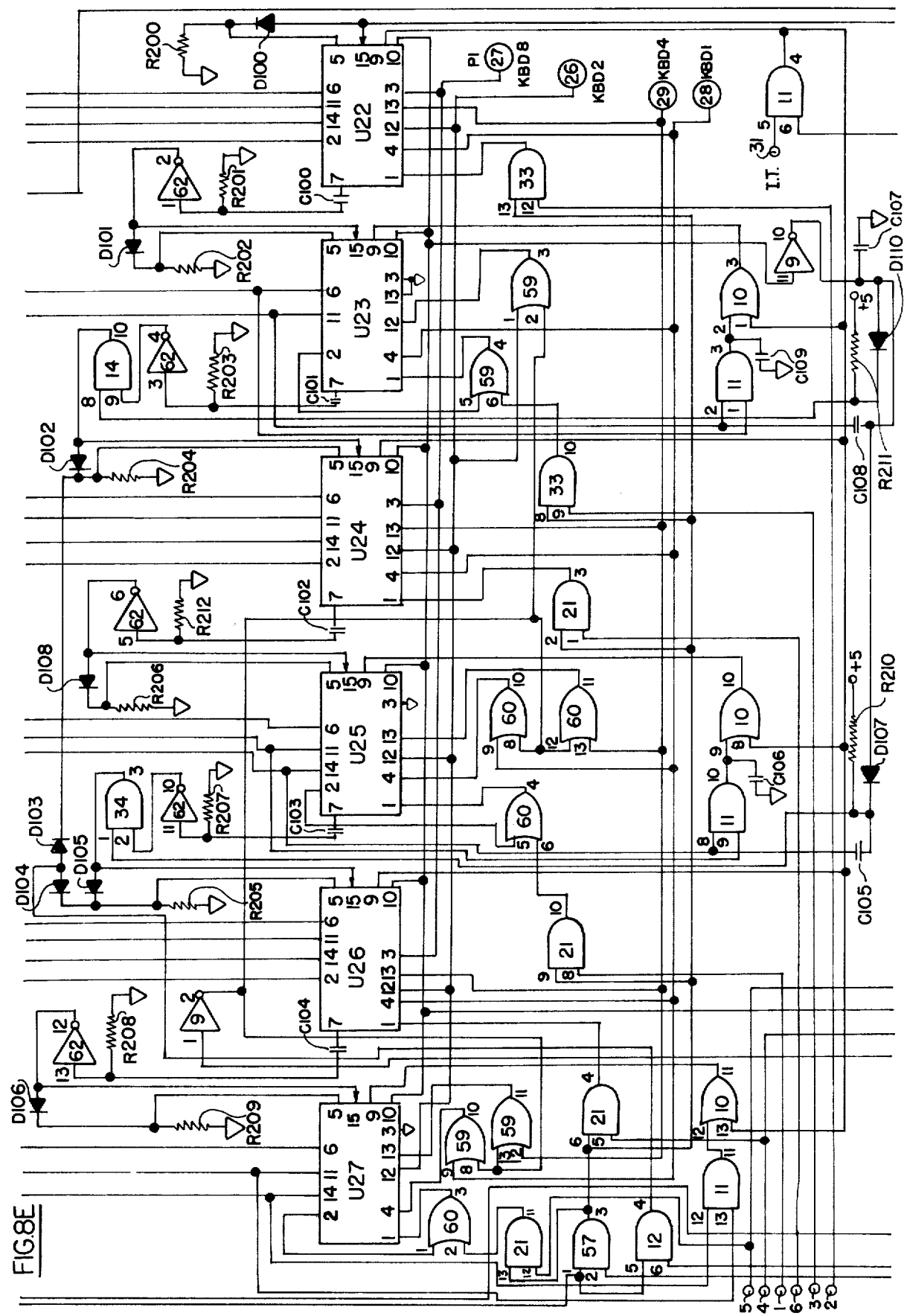

When any numeral key of the program computer keyboard (FIG. 4) is depressed, integrated circuit U10, which is a 74147 BCD encoding device, develops the appropriate numerical weight which is buffered through integrated circuit 9, and which is applied to the main logic circuit of FIG. 8E as KBD commands 1, 2, 4 and 8. When any numeral key is depressed, a pulse appears at pin 14 of the 4022 integrated circuit U12. The integrated circuit U12 is an 8-bit Johnson counter, which is permuted to a maximum count of six by diodes D6 and D7 which connect back to the reset pin 15. Capacitors C4-C8, and the pull-down resistors R40-R45 are used to develop a narrow pulse which loads the BCD data present on the KBD lines into the appropriate register, depending upon the sequence in which the keys are operated. This operation will be further discussed in the description of FIG. 8F.

Status command signals RECORD and PLAY are also developed by the keyboard encoding circuit of FIG. 6 when the RECORD and PLAY keys are operated, and these signals are applied to pins 13 and 9 of integrated circuit 7 which is formed of cross-coupled "nand" gates, and which is used as a latch. The output from pin 11 of integrated circuit 7 drives transistor Q2, lighting the LED 56 status indicator to indicate that the RECORD key has been depressed. This portion of integrated circuit 7 causes the RECORD command to be stored after the user's finger leaves the RECORD key. The RECORD command is later fed to the main logic circuit of FIG. 8F by way of terminal 34 to develop record sequence programming.

The output from pin 8 of integrated circuit 7 drives transistor Q1, lighting the LED indicator 54 to indicate that the PLAY key has been depressed. This portion of integrated circuit 7 stores the key bommand after the user's finger leaves the PLAY key. The PLAY command signal is later fed to the main logic circuit of FIG. 8F by way of terminal 36 to develop playback sequence programming.

The four remaining status command signals are designated INSERT TIME, SEARCH, KEYBOARD and CLEAR. The INSERT TIME and SEARCH signals are stored in integrated circuit 8, which is a pair of cross-coupled "nand" gates forming latches. The latched INSERT TIME command appears at pin 8 of integrated circuit 8, and drives transistor Q4 to energize the LED indicator 58 to display the INSERT TIME mode. The latched KEYBOARD command simultaneously clears INSERT TIME by setting integrated circuit 8, pin 1; and at the same time by latching integrated circuit 8, pin 13, which drives transistor Q4, energizing LED 6s to indicate the KEYBOARD mode.

The KEYBOARD latch formed by integrated circuit 8, pin 11, can only be cleared by the initiation of a SEARCH command. The SEARCH command is fed to the logic circuit of FIG. 7 by terminal 47 in which it is latched, and the latched SEARCH command designated "SEARCH LIGHT" is returned to the keyboard encoding circuit of FIG. 6 by way of terminal 41, where it is used to drive transistor Q5 to illuminate LED 60 as long as the system is in the SEARCH mode.

The third major function accomplished by the KEYBOARD encoder is the storage and decoding of the SEARCH drive commands to the external video tape recorders. The playback and record video tape recorders are handled separately, since, as mentioned above, there may be a requirement for one of the tape recorders to search independently of the other. The SEARCH function is achieved by the logic circuit of FIG. 7.

In FIG. 7, terminal 47 is connected to pin 7 of integrated circuit 19, and pin 9 is connected to terminal 41 and to pin 8 of integrated circuit 15. Pin 9 of integrated circuit 19 is also connected to integrated circuit U17. Integrated circuit U17 is clocked when the latch circuit formed by integrated circuit 19 is set, and integrated circuit U17 is set by a PLAYBACK command signal received by way of terminal 36, and is reset in the absence of a PLAYBACK command signal.

Terminal 9 of the circuit of FIG. 7 is connected to pin 9 of integrated circuit 15, and pin 10 of integrated circuit 15 is connected to pin 5 of integrated circuit 14, to pin 5 of integrated circuit 20, to pin 3 of integrated circuit 19, and to pin 13 of integrated circuit 16. Pin 4 of integrated circuit 14 is connected through a 10 kilo-ohm resistor R100 and through a 20 kilo-ohm resistor R101 to the base of NPN transistor Q9. The collector of transistor Q9 is connected through a 4.7 kilo-ohm resistor R102 to the positive terminal of the 5-volt source, and is connected through diode D10 to terminal 3. The collector of transistor Q9 is also connected to pin 13 of integrated circuit 15. Pin 11 of integrated circuit 15 is coupled through a 10 microfarad capacitor C20 to pin 1 of integrated circuit 20, and through a 20 kilo-ohm resistor R103 to the positive terminal of the 5-volt source. Pin 2 of integrated circuit 20 is connected to the junction of a 20 kilo-ohm resistor R105 and a 10 microfarad capacitor C21, the resistor and capacitor being shunted across the 4.7 kilo-ohm resistor R106 which is connected between the positive terminal of the 5-volt source and the collector of an NPN transistor Q12. The collector of an NPN transistor Q14 is connected to the junction of resistors R100 and R101. The emitters of transitors Q12 and Q14 are grounded. The collector of transistor Q12 is also connected through diodes D12 and D14 to terminals 1 and 2.

Pin 13 of integrated circuit 10 is coupled through a 10 microfarad capacitor C24 to pin 9 of integrated circuit 13. Pin 9 is also connected through a 150 kilo-ohm resistor R110 to the positive terminal of the 5-volt source. Pin 8 of integrated circuit 13 is connected through a 10 kilo-ohm resistor R111 to the base of transistor Q14, and through a 20 kilo-ohm resistor R112 to the base of transistor Q12. Pin 8 of integrated circuit 13 is also connected back to pin 5 of integrated circuit 18.

Pin 4 of integrated circuit 18 is coupled through a monolithic 0.1 microfarad capacitor C25 to pin 6 of integrated circuit 19 and through a 20 kilo-ohm resistor R113 to the positive terminal of the 5-volt source. Pin 6 of integrated circuit 18 is connected to pin 10 of integrated circuit 13, and through a 10 kilo-ohm resistor R114 to the base of an NPN transistor Q8.

The emitter of transistor Q8 is grounded, and the collector is connected to the junction of a pair of resistors R115 and R116 of 10 kilo-ohms and 20 kilo-ohms respectively. Pin 10 of integrated circuit 13 is also connected through a 10 kilo-ohm resistor R117 to the base of an NPN transistor Q7, whose emitter is grounded. The collector of transistor Q7 is connected through a 4.7 kilo-ohm resistor R118 to the positive terminal of the 5-volt source, and through a 10 microfarad coupling capacitor C26 to pin 13 of integrated circuit 20, and to a 20 kilo-ohm resistor R120. Resistor R120 is connected to the positive terminal of the 5-volt source. Pin 12 of integrated circuit 20 is connected through a 20 kilo-ohm resistor R121 to the positive terminal of the 5-volt source. Integrated circuit 20 may be of the type designated 4011. Pin 11 of integrated circuit 20 is connected through a 20 kilo-ohm resistor R122 to the base of an NPN transistor Q10. The collector of transistor Q10 is connected through a 4.7 kilo-ohm resistor R123 to the positive terminal of the 5-volt source, and the collector is also connected through a diode D15 to terminal 15.

Terminal 5 of the circuit of FIG. 7 is connected to pin 6 of integrated circuit 15 and to pin 12 of integrated circuit U17. Pin 4 of integrated circuit 15 is connected to pin 8 integrated circuit 14, to pin 11 of integrated circuit 19, to pin 8 of integrated circuit 20 and to pin 2 of integrated circuit 16. Pin 10 of integrated circuit 14 is connected to resistor R115. Resistor R116 is connected to the base of an NPN transistor Q11, whose emitter is grounded. The collector of transistor Q11 is connected through a 4.7 kilo-ohm resistor R126 to the positive terminal of the 5-volt source, and through diode D20 to terminal 4. The collector is also connected to pin 2 of integrated circuit 15. Pin 3 of integrated circuit 15 is coupled through a 10 microfarad coupling capacitor C27 to pin 12 of integrated circuit 20.

Terminal 6 of the circuit of FIG. 7 is connected to pin 9 of integrated circuit 14 and to pin 6 of integrated circuit 14. Terminal 8 is connected to pin 9 of integrated circuit 16 and to pin 5 of integrated circuit 16. Terminal 7 is connected to pin 2 of integrated circuit 14 and to pin 13 of integrated circuit 14. Pin 11 of integrated circuit 14 is connected through a 20 kilo-ohm resistor R130 to the base of an NPN transistor Q16. The emitter of transistor Q16 is grounded, and the collector is connected to pin 12 of integrated circuit 15. The collector is also connected through a 4.7 kilo-ohm resistor R131 to the positive terminal of the 5-volt source, and through a diode D21 to terminal 11. Pin 3 of integrated circuit 20 is connected through a 20 kilo-ohm resistor R132 to the base of an NPN transistor Q13. The emitter of transistor Q13 is grounded, and the collector is connected through a 4.7 kilo-ohm resistor R133 to the positive terminal of the 5-volt source, and through a diode D22 to terminal 16.

Terminal 8 of the circuit of FIG. 7 is connected to pin 9 of integrated circuit 16 and to pin 5 of integrated circuit 16. Integrated circuit 16 may be of the type designated 4011. Pin 10 of integrated circuit 16 is connected to pin 1 of integrated circuit 18. Pin 3 of integrated circuit 18 is connected to pin 6 of integrated circuit 20, and pin 4 of integrated circuit 20 is connected to pin 4 of integrated circuit 19. Terminal 7 is connected to pin 2 of integrated circuit 14 and to pin 13 of integrated circuit 14. Pin 3 of integrated circuit 14 is connected through a 20 kilo-ohm resistor R134 to the base of an NPN transistor Q15. The emitter of transistor Q15 is grounded, and the collector is connected to pin 1 of integrated circuit 15, through a 4.7 kilo-ohm resistor R135 to the positive terminal of the 5-volt source, and through diode D23 to terminal 12.

RECORD terminal 34 of the circuit of FIG. 7 is connected to pin 5 of integrated circuit 16, and pin 4 of integrated circuit 16 is connected to pin 12 of integrated circuit 18. Pin 11 of integrated circuit 18 is connected to pin 9 of integrated circuit 20. Pin 10 of integrated circuit 20 is connected to pin 12 of integrated circuit 19. Pin 10 of integrated circuit 19 is connected to pin 1 of integrated circuit 16 and through a 10 microfarad coupling capacitor C30 to pin 11 of integrated circuit 13. Pin 11 of integrated circuit 13 is also connected through a 150 kilo-ohm resistor R140 to the positive terminal of the 5-volt source. Pin 10 of integrated circuit 13 is connected to resistor R114, and back to pin 6 of integrated circuit 18. Terminal 10 is connected to pin 13 of integrated circuit 18 and to pin 2 of integrated circuit 18. The collector of transistor Q7 is connected through diode D30 to terminal 13 and through diode D31 to terminal 14.

The SEARCH button command signal at terminal 47 of the circuit of FIG. 7 is latched by the latching circuit formed by integrated circuit 19, and when the latching circuit is set, it serves to clock integrated circuit U17. Integrated circuit U17 is in the form of a flip-flop which is set in the presence of the PLAY command at terminal 36, and is reset in the absence of the PLAY command, that is in the presence of the RECORD command. The integrated circuit U17 is incorporated to prevent the operator from taking the computer out of the PLAY SEARCH mode, for example, to time an insert duration of the record video tape recorder, and thereby causing the playback video tape recorder to miss its STOP command when a match occurs.

If, for example, the operator attempts to initiate a search on the playback recorder, the PLAY command on pin 36 would be true, which would present a high level to pin 9 of integrated circuit 17. When the SEARCH key is activated, thereby causing the SEARCH LIGHT command to be true on terminal 47, the search status LED indicator 60 (FIGS. 4 and 6) is illuminated and integrated circuit 17 is set true. Therefore, pin 13 of integrated circuit 17 is high. This high level is presented to pin 5 of integrated circuit 14, to pin 5 of integrated circuit 20, to pin 3 of integrated circuit 19, and to pin 13 of integrated circuit 16, enabling the latter integrated circuits. This permits the PLAY SEARCH decoder logic to establish whether the controlled video tape recorder should go into its fast forward mode or rewind mode; or whether the recorder is already at the point to be searched, or whether it is approaching that point and needs to stop. If the controlled video tape recorder is to be set to its fast forward mode for the search, pin 4 of IC 14 goes true. The resulting high level at pin 4 causes transistor Q9 to become conductive, thereby pulling down its collector, and drawing current through diode D10 and terminal 3 to set the playback video tape recorder to its fast forward mode. The playback video tape recoder remains in its fast forward mode until a match is developed in the logic circuit of FIG. 8A, which will be discussed subsequently.

If the playback video tape recorder is required to enter its rewind mode to accomplish the search, pin 11 of integrated circuit 14 goes high, and transistor Q16 becomes conductive, causing current to flow through terminal 11 and diode D21. This causes the playback video tape recorder to enter its rewind mode. This action occurs because the "GREATER THAN" (A>B) command developed by the logic circuit of FIG. 8A, and which is applied through terminal 6 to pin 12 of integrated circuit 14, is also true, indicating that the playback video tape recorder should enter into a rewind direction to develop an "EQUAL TO" command, which means that it has arrived at the desired point and, therefore, should stop.

When the "MATCH" (A = B) command is developed and detected by the logic circuit of FIG. 8A, it is fed by way of terminal 10 to pins 2 and 13 of integrated circuit 18. Since it is impossible to search both the record and playback video tape recorders simultaneously, this command is fed to the appropriate decoding circuit. In the case of the playback video tape recorder, the "MATCH" command is fed to pin 2 of integrated circuit 18, where it is "OR'ed" with the stored PLAY command developed at terminal 36, and a CLEAR/SEARCH HOUSEKEEPING command at terminal 8 which is developed by the SEARCH LIGHT command and clear command by the logic circuit of FIG. 8C. The CLEAR/SEARCH HOUSEKEEPING command permits the operator to terminate the search at any point by developing a pseudo "MATCH" command which will stop the video tape recorder, re-thread the video tape recorder, and place it into a pause position.

If a true "MATCH" command is developed at pin 2 of integrated circuit 18, a high level is presented to pin 2 of integrated circuit 18 which is fed to pin 6 of integrated circuit 20. This section of integrated circuit 20 is a "nand" gate, and it is enabled only if the circuit is in the playback mode, that is, only if integrated circuit U17 is set. If this is the case, pin 4 of integrated circuit 20 goes true, causing pin 4 of integrated circuit 19 to set the adjacent section of the integrated circuit which latches the "MATCH" command signal. The latch stores the EQUAL command for a sufficient interval to develop a STOP at terminal 1, causing the playback video tape recorder to stop. Pin 13 of integrated circuit 19 goes low at this time, and a time constant is developed by capacitor C24 and resistor R110 at pin 9 of integrated circuit 13.

After a predetermined time interval, determined by the time constant of the resistance-capacitance circuit R110 - C24, pin 8 of integrated circuit 13 goes true, causing both transistors Q12 and Q14 to become conductive. When transistor Q12 is conductive, it draws current from terminal 1 through diode D12, activating the STOP button of the playback video tape recorder, thus placing the playback video tape recorder in its joystick mode. At the same time, the transistor Q12 draws current through terminal 2 and diode D14 to place the playback video tape recorder in its FORWARD mode. Therefore, the playback video tape recorder will be placed in its normal FORWARD mode, but will simultaneously be placed in its joystick mode. Therefore, the playback video tape recorder will be in a joystick pause mode awaiting the operator's joystick selection of the new edit point.

At the same time, the transistor Q14 is rendered conductive to mute the FAST FORWARD command at terminal 3. This is because the playback video tape recorder in now proceeding rapidly in the rewind direction, and if the transistor Q14 does not mute the FAST FORWARD command, a slight overshoot could occur, which might cause the system to initiate a FAST FORWARD command. Therefore, a possible oscillation condition could occur if transistor Q14 does not mute the FAST FORWARD command at this time. This operation is accomplished in the rewind direction by pin 13 of integrated circuit 16, and pin 12 of integrated circuit 16, when the signals at both these pins are true. Pin 11 of integrated circuit 16 provides a similar function when the playback video tape recorder is searching from a fast forward direction, and when the signal at that pin is true, integrated circuit 16 serves to mute the REWIND command, for the same reason.

When transistor Q12 is rendered conductive to cause the playback video tape recorder to go into the forward mode, capacitor C21 of RC circuit R105, C21 is pulled low causing pin 3 of integrated circuit 20 immediately to go high, and to remain high for approximately one-half second, until capacitor C21 becomes charged. When pin 3 of integrated circuit 20 is high, transistor Q13 is rendered conductive, and it remains conductive, drawing a current through terminal 16 and diode D22 to hold down the STOP button on the playback video tape recorder for about one-half a second to allow an appropriate settling time for the mechanical solenoids within the video tape recorder. After the STOP button has been released, transistor Q21 is still conductive to hold the playback video tape recorder in its forward mode. Therefore, when the STOP command is released, and after the solenoids have settled, the FORWARD command which is present at terminal 2 still remains, and the playback video tape recorder will thread into its normal forward mode.

A similar logic structure is provided in the search logic circuit of FIG. 7 for the record video tape recorder, and the operation is analagous. In this case, pins 8, 9 and 10 of integrated circuit 14 develop the FAST FORWARD command through transistor Q11; pins 1, 2 and 3 of integrated circuit 14 develop the REWIND command signal through transistor Q15; and pin 10 of integrated circuit 19 goes true in the presence of the MATCH command signal, causing a time-out through pin 11 of integrated circuit 13, thereby developing the STOP command signal for the record video tape recorder at terminal 13.

The comparators used to develop the search commands which stop the video tape recorders, or tell them to go forward or reverse, are developed in the logic circuit of FIG. 8A through a bank of six comparators U37-U42, each of which may be an integrated circuit of the type designated 74C85. Pin 12 of integrated circuit U37 is connected to terminal 7 which presents the "LESS THAN" mismatch command (A<B); pin 13 of integrated circuit U37 is connected to terminal 6 which produces the "GREATER THAN" mismatch command (A>B); and pin 3 is connected to terminal 10 which produces the EQUAL TO match command (A = B). The comparators U37-U42 are BCD in nature, and are used for insert time comparisons in addition to developing the search logic. The integrated circuits U37-U42 are used to accomplish two functions. One of these functions, as described above, is to develop the search decoding commands which drive the search logic of FIG. 7 to detect whether the controlled video tape recorder should go into fast forward, rewind or stop. The second function of these comparators is to provide programmed edit capability.

The comparators U37-U42 have two banks of inputs, one of which is developed under program control by the operator, namely the STORED KEYBOARD command. The other input is connected from a dual tape (TT-4/TT-5) timing circuit (FIG. 9) which is connected to the video tape editing unit 10 of FIG. 1. Timing signals from the dual tape timing circuit provide search information for the program computer. These timing signals are weighted BCD signals corresponding to the appropriate digit of seconds-units, seconds-tens, minutes-units and minutes-tens, which are developed in the timing circuit. The BCD timing signals are fed in parallel by way of pins 1-27 of a connector P2-A to a bank of "and/or" select integrated circuit gates U16-U19 in FIG. 8A, each of which may be of the type designated 4019. This allows an immediate selection of record or playback tape time so that logic simplification can be accomplished.

A high level at terminal 5, which is connected to pins 14 of the gates, allows the record commands to pass through the gates; whereas a high level at terminal 9, which is connected to pins 9 of the gates, permits the playback commands to pass through the gates. The BCD logic levels are then presented to a second level of "and/or" select gates designated U28-U32, which likewise may be integrated circuits of the type designated 4019. Only the first four most significant decades of integrated circuits U28-U32 are used in the search mode. This is because only four digits of BCD parallel information are required, namely minutes-units, minutes-tens, seconds-units and seconds-tens. Frames are not used in the search mode by the computer and, accordingly, the indicators 66 and the LEDs CR8 and CR9 of FIG. 5 are extinguished.

The second level of "and/or" select gates U28-U32 delegates whether the comparators U27-U42 are looking for search data or whether they are looking actually to end an edit. During the search data mode, the SEARCH LIGHT command at terminal 41 is high. Therefore, pin 9 of the gates U28-U32 is high, and the parallel BCD information from the timing circuit of FIG. 9, whether RECORD or PLAYBACK has been selected by gates U16-U19, is presented to the comparators U27-U42. The resulting left justified positive true BCD logic is presented to pins 14, 1, 9 and 11 of each comparator U37-U42. The pins 14, 1, 9 and 11 of the respective comparators U37-U42 represent the A input; and the pins 15, 2, 7 and 10 of the comparators represent the B input.

When the A input is less than the B input, terminal 7 goes high; when the A input is greater than the B input, terminal 6 goes high; and when the A input matches the B input, terminal 10 goes high. As was previously discussed, a GREATER THAN (A>B) command at terminal 6 indicates that the timing circuit is reading a greater time than the user has entered by way of the keyboard, and therefore, the program computer knows that place the controlled video tape recorder in the rewind direction so that a MATCH (A=B) command may be developed. Likewise, if the user has entered a greater time than the tape timer indicates, a LESS THAN (A<B) command is developed at terminal 7, thereby putting the controlled video tape recorder into fast forward. When a MATCH (A=B) is developed, terminal 10 goes high and the controlled video tape recorder is stopped.

The PRE lines 1-6 from the logic circuit of FIG. 6, and the KBD lines 1, 2, 4 and 8 from the circuit are connected to a series of counters U48-U53 in FIG. 8B, which feed the B signals to the comparators U37-U42 in FIG. 8A. These counters may be integrated circuits of the type designated 4510. The counters also serve a dual function, as will be described, thereby conserving logic in the implementation of the program computer.

In the search operation, data is loaded into the counters U48-U53 by way of the six PRE lines connected to terminals 5, 4, 1, 6, 3 and 2 respectively of FIG. 8B; and by way of the four data lines KBD 1, 2, 4 and 8, connected to terminals 28, 26, 29 and 27 respectively. As discussed above in conjunction with the keyboard encoder circuit of FIG. 6, when any numeral key of the keyboard is actuated, a weighted code is developed which represents the number that the operator has depressed. For example, if the numeral key "7" is depressed, the 4, 2 and 1 KBD lines all become high. The resulting data is presented to all the counter integrated circuits U48-U53, but only the counter which receives a true pre-set from a corresponding PRE line will have the data entered.

Therefore, if the first numeral key actuated is a "3", for example, the KBD lines 1 and 2 become high, and the PRE line 1 becomes high. This causes a "3" to be loaded into integrated circuit U48, which represents the digit of display CR13 of FIG. 5. Then, if the second numeral key actuated is a "7", the KBD lines 1, 2 and 4 become high, but this time only the PRE line 2 goes high, thereby loading the bits into the integrated circuit U49, representing the digit of the LED CR12 of the display 52 of FIG. 5, and so on.

Each PRE line goes high in sequence, and only after the previous PRE line has been set high, so that the digits are loaded from the left to the right, starting with the integrated circuit U48, and ending with the integrated circuit U53. Now, in the search mode, the PRE lines are truncated, so that only four bits can be loaded, corresponding to the minutes and seconds indications of display 52 of FIG. 5, so that the data entry stops at integrated circuit U51.

The outputs of the counters U48-U51 are also fed, not only to the comparators U37-U40 of FIG. 8A, but simultaneously to another level of "and/or" select gates U44-U47 in FIG. 8A. These gates, likewise, may be integrated circuits of the type designated 4019. The outputs of gates U44-U47 are fed to the integrated circuits U1-U6 of FIG. 5 by way of a connector P1 to light the LED displays CR10-CR13, and to provide visual feedback to the operator so that he may observe which digits have been loaded to insure that they are the correct ones. Once the appropriate search digits have been loaded into the integrated circuits U48-U51 of FIG. 8B, and when the SEARCH key is depressed, the search action commences. Now, the comparators are enabled to look for a MATCH command (A=B) to terminate the search when a match is achieved between the data which the user has entered, and the time data entered by the timing circuit of FIG. 9 which is connected to the video tape recorders. Only one bank of comparators is required for both the playback and record video tape recorders, since only one of the video tape recorders is searched at any one time.

An important function of the computer 50 of FIG. 1 is to control the tape editing system for timed inserts.

Timed inserts allow the user to select the out-edit point and the duration of the edit, which is beyond the capabilities of the edit sytem alone in which only the beginning point of the edit may be selected. The timed insert logic is shown in FIG. 8E, and it comprises a six-digit insert register made up of integrated circuit standard up/down decade counters U22-U27, each of which may be of the type designated 4510. The up/down counters normally count up; the down mode being used only in one very special case, which will be described. The keyboard data is loaded into the register U22-U27 through terminals 27, 26, 29 and 28, and the PRE lines are also connected to the register, so that data may be loaded into the register in the same manner as described above with respect to the register U48-U53 of FIG. 8B. The PRE lines and the KBD lines are simultaneously connected in parallel to the register U22-U27, and this allows the operator to enter any desired insert time if he knows the duration of the scene he wishes to edit. If he does not know the duration, he may delegate the register U22-U27 to either the record or playback video tape recorder, thereby allowing him to time the unknown duration.

Pin 5 of integrated circuit U22 is connected to a grounded 20 kilo-ohm resistor R200 and through diode D100 to pin 15. Pin 7 of integrated circuit U22 is coupled through a 0.001 microfarad capacitor C100 to a grounded 20 kilo-ohm resistor R201 and to pin 1 of integrated circuit 62. Pin 2 of integrated circuit 62 is connected through a diode D101 to a grounded 20 kilo-ohm resistor R202, and to pin 15 of integrated circuit U23. Pin 5 of integrated circuit U23 is also connected to grounded resistor R202. Pin 7 of integrated circuit 23 is coupled through a 0.001 coupling capacitor C101 to a grounded 20 kilo-ohm resistor R203 and to pin 3 of integrated circuit 62. Pin 15 of integrated circuit U24 is connected through a diode D102 to a grounded 20 kilo-ohm resistor R204 and through diodes D103 and D104 to a grounded 20 kilo-ohm resistor R205.

Pin 7 of integrated circuit U24 is coupled through a 0.001 microfarad capacitor C102 to a grounded 20 kilo-ohm resistor R206 and to a pin 5 of an integrated circuit 62. Pin 6 of integrated circuit 62 is connected through a diode D105 to a grounded 20 kilo-ohm resistor R206. Pin 7 of integrated circuit U25 is coupled through a 0.001 microfarad capacitor C103 to a grounded 20 kilo-ohm resistor R207 and to pin 11 of integrated circuit 62. Pin 7 of integrated circuit U26 is coupled through a 0.001 microfarad capacitor C104 to a grounded 20 kilo-ohm resistor R208 and to pin 13 of integrated circuit 62. Pin 12 of integrated circuit 62 is connected through a diode D106 to a grounded 20 kilo-ohm resistor R209. Pin 15 of integrated circuit U26 is connected through a diode D105 to grounded resistor R205.

Pin 14 of integrated circuit U25 is coupled through a 0.001 microfarad capacitor C105 and through a 47 kilo-ohm resistor R210 to the positive terminal of the 5-volt source. Terminal 14 is also connected to pin 8 of integrated circuit 11, and pin 10 of integrated circuit 11 is connected to pin 9 of integrated circuit 10 and to grounded 0.01 microfarad capacitor C106. Capacitor C105 is also connected through diode D107 to a grounded 0.01 microfarad capacitor C107 and through a 0.001 microfarad capacitor C108 to pin 11 of integrated circuit U23. Pin 11 is also connected to pin 2 of integrated circuit 11, and pin 3 of integrated circuit 11 is connected to pin 2 of integrated circuit 10 and to a 0.01 microfarad grounded capacitor C109. Pin 8 of integrated circuit 14 is connected through a 47 kilo-ohm resistor R211 to the positive terminal of the 5-volt source, and through a diode D110 to the grounded capacitor C107.

As mentioned above, the integrated circuits U22-U27 of FIG. 8E are up-down counters. Normally, the counters are delegated in the up mode to the control tracks of the video tape in either the playback or record video tape recorder. The signals from the control track of the tape in the record video tape recorder are introduced to the logic circuit by way of terminal 27 of FIG. 8F; and the signals from the controls tracks of the playback video tape recorder are introduced by way of terminal 25, of connecter P-2B. Terminal 27 is connected to pin 11 of integrated circuit 61, and terminal 25 is connected to pin 3 of integrated circuit 61. Integrated circuit 61 may be of the type designated 4013.

Figure 8F:
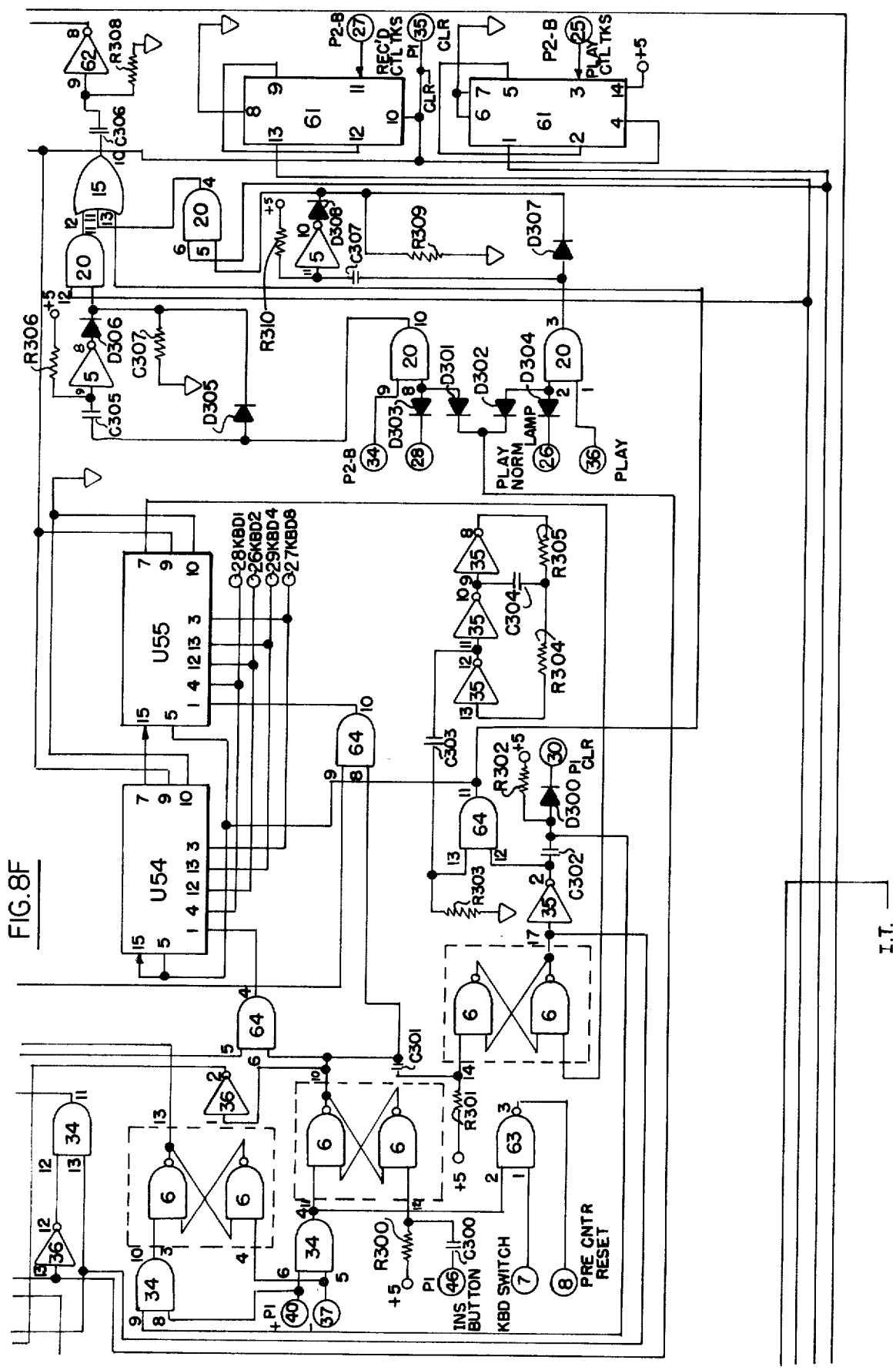

The "INSERT BUTTON" command from the keyboard encoder circuit of FIG. 6 is introduced to the circuit of FIG. 8F by terminal 46 of connector P1. The KEYBOARD BUTTON command from the keyboard encoder circuit is introduced to the circuit of FIG. 8F by way of terminal 7, and the PRE CENTER RESET command from the keyboard encoder circuit of FIG. 6 is introduced to the circuit of FIG. 8F by way of terminal 8 of connector P1. Terminal 46 is coupled through a 0.1 microfarad capacitor C300 to pin 12 of integrated circuit 6, and through a 20 kilo-ohm resistor R300 to the positive terminal of the 5-volt source. Pin 10 of integrated circuit 6 is connected to pin 6 of integrated circuit U55. Integrated circuits U54 and U55 may be of the type designated 4510.

Pin 10 of integrated circuit 6 is also connected through a 0.001 microfarad capacitor C301 to pin 14 of integrated circuit 6, and through a 20 kilo-ohm resistor R301 to the positive terminal of the 5-volt source. Pin 17 of integrated circuit 6 is connected to integrated circuit 35, and integrated circuit 35 is connected to pin 12 of integrated circuit 64, and through a 0.01 microfarad capacitor C302 to the anode of a diode D300, and through a 300 kilo-ohm resistor R302 to the positive terminal of the 5-volt source. The cathode of diode D300 is connected to terminal 30 of connecter P1 to receive the command BAR CLEAR from the keyboard encoder circuit of FIG. 6.

Pin 13 of integrated circuit 64 is connected to a grounded 20 kilo-ohm resistor R303, and through a 0.01 microfarad capacitor C303 to pin 12 of integrated circuit 35 and pin 11 of integrated circuit 35. Pin 13 of integrated circuit 35 is connected to a 20 kilo-ohm resistor R304 which, in turn, is connected to a 0.01 microfarad capacitor C304 and to a 47 kilo-ohm resistor R305. Capacitor C304 is connected to pin 10 and pin 9 of integrated circuit 35, and resistor R305 is connected to pin 8 of integrated circuit 35.

Pin 3 of integrated circuit 14 of FIG. 8D is connected to diodes D301 and D302 of FIG. 8F. The RECORD command from terminal 34 of FIG. 6 is introduced to pin 9 of integrated circuit 20 of FIG. 8F, whereas the PLAYBACK command from terminal 36 of the keyboard encoder circuit of FIG. 6 is introduced by way of terminal 36 to pin 1 of integrated circuit 20. The RECORD NORMAL LAMP command is received by way of terminal 28, which is connected to a diode D303, and the PLAYBACK NORMAL LAMP command is received by way of terminal 26, which is connected to a diode D304. Diodes D301 and D303 are connected to pin 8 of integrated circuit 20, and diodes D302 and D304 are connected to pin 2 of integrated circuit 20. Pin 10 of integrated circuit 20 is connected to a diode D305 and to a 3.3 microfarad capacitor C305. Capacitor C305 is connected to pin 9 of integrated circuit 5 and through diode D306 to pin 13 of integrated circuit 20 and to a grounded 20 kilo-ohm resistor R307. Pin 11 of integrated circuit 20 is connected to pin 12 of integrated circuit 15, and pin 10 of integrated circuit 15 is connected through a 0.001 microfarad capacitor C306 to pin 9 of integrated circuit 62, and to a grounded 20 kilo-ohm resistor R308.

Pin 3 of integrated circuit 20 is connected through diode D307 to pin 5 of integrated circuit 20, to a grounded 20 kilo-ohm resistor R309, and through diode D308 to pin 10 of integrated circuit 5. Pin 11 of integrated circuit 5 is connected through a 3.3 microfarad capacitor C307 to the anode of diode D307, and through a 68 kilo-ohm resistor R310 to the positive terminal of the 5-volt source.

As stated above, the various sections of the integrated circuits described above are shown in the drawings in their conventional symbol form. In FIGS. 8A–8F, all latches are 4044's; all "and" gates are 4081's; all diodes are IN4148's; all inverters are 4069's; (except U36 which is a 74C14 Schmitt trigger); all two-inputs "or" gates are 4071's; and all three-input "or" gates are 4075's.

The integrated circuit 61 divides-by-two the control pulses received from the tapes of the playback and record video tape recorders and allows 30 Hertz tracks, or 33 millisecond pulses, to be present at pin 9 of integrated circuit 62. A level of gating, consisting of integrated circuit 20, is required to delegate which video tape recorder is to be timed. Since the video tape recorders can move only in the "NORMAL" mode of the edit system of FIG. 1, the PLAY NORMAL LAMP signal at pin 2 of integrated circuit 20, or RECORD NORMAL LAMP signal at pin 8 of integrated circuit 20, is used to decide whether the control tracks of the playback video tape recorder of of the recorder video tape recorder are to be counted. Additionally, since there is inertia involved when the operator stops the video tape recorders, pins 8 and 10 of integrated circuit 5 have a slight delay, or time-out, consisting of capacitor C305 and resistor R306, and of capacitor C307 and resistor R310, respectively, so as to allow for inertia in the recorders, and in order that correct counting action can occur.

Therefore, the appropriate control pulses are present at pin 9 of buffer inverter integrated circuit 62, and are fed through the buffer inverter to the clock input pin 15 of integrated circuit U22 of FIG. 8E, which is the least significant bit of the insert register U22-U27. Integrated circuit U22 is a standard up/down decade counter, and it divides by ten. When a count of "9" occurs, pin 2 of integrated circuit 62 in FIG. 8E generates a pluse to the clock input pin 15 of integrated circuit U23. Integrated circuit U23 is also a standard up-down decade counder but is permuted to count MOD3. Therefore, the integrated circuit U23 counts only 0, 1 and 2 inclusive. When a count of 2 is detected in the up direction of counter U23, integrated circuit U24 receives the pulse. Integrated circuit U25 is also an up-down decade counter. A similar action proceeds between the up-down counters U25, U26 and U27, the counter U25 being MOD6, the counter U26 being decade, and the counter U27 being MOD6. Therefore, the two least significant bits of the insert register count to 29 by counters U22 and U23, corresponding to the number of frames in the video tape recorder being counted; the counters U24 and U25 count to 59 maximum corresponding to the number of seconds; and the counters U26 and U27 also count to 59, corresponding to 59 minutes. Therefore, when the entire insert register formed by counters U22-U27 is full, the display of FIG. 5 displays 59 minutes, 59 seconds, and 29 frames, corresponding to an hour of the particular video tape recorder being counted.

Should the operator time a duration on the playback video tape recorder, for example, and then decide that perhaps the particular scene was slightly too long or slightly to short; he has the capability of trimming either up or down to 99 frames in a given pass. This trim action may be repeated until the operator has trimmed the entire duration down, or the operator may resort to the keyboard and re-enter a new duration, if it is in excess of 99 frames, and the operator does not wish to re-initiate a second trim. The trim operation will be discussed subsequently.

The BCD outputs from the insert register U22-U27 are introduced to the gates U43-U47 of FIG. 8D, to be applied to the display circuit of FIG. 5 for visual display. The BCD outputs are also applied to the gates U28-U32 of FIG. 8A which decide whether INSERT TIME or SEARCH is being routed to the comparators U37-U42. For INSERT TIME mode, pin 9 of each comparator U28-U32 is low, and pin 14 is high, so that the output of the insert timer of FIG. 8E, during this mode, is presented to both levels of comparators U27-U42 in FIG. 8A. During this mode, the count of the insert register U22-U27 of FIG. 8E is compared with a floating register formed by the counters U28-U53 of FIG. 8B. During the INSERT TIME mode, the floating register is used temporarily to hold the position of the video tape to be compared against the known duration which now exists in the register U22-U27.

Figure 9:
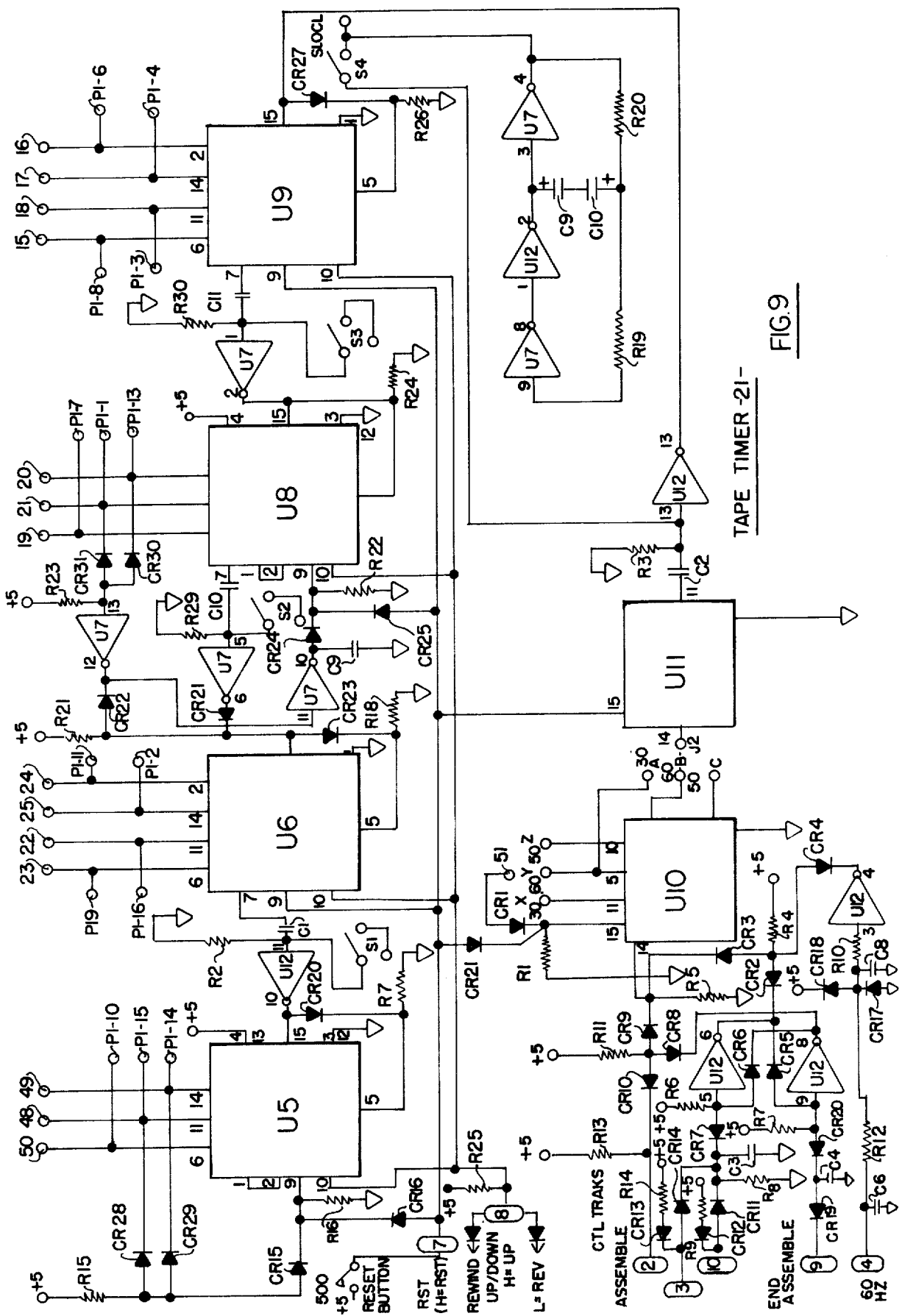
FIG. 9 is a logic diagram of a timing circuit connected to the video tape editing unit and which responds to control pulses recorded on the tapes of the video tape recorders to supply digital timing signals to the computer.

The video tape recorders are now backed up to a known pre-roll point, and are then moved forward while counting the control tracks by the timing circuit of FIG. 9, and by continuously comparing the control track information against the information stored in the insert register U22-U27. This action occurs since pin 15 of counter U53 of FIG. 8B is connected back through a level of gating in FIG. 8C which selects whether PLAYBACK or RECORD is being utilized, and whether the system is in the INSERT mode.

In the circuit of FIG. 8C, the RECORD command from the keyboard encoder circuit of FIG. 6 is received by way of terminal 34 of connector P1, and the PLAYBACK command is received by way of terminal 36 of connector P1. Terminal 34 is connected to pin 8 of integrated circuit 2 and to pin 6 of integrated circuit 4. Terminal 36 is connected to pin 5 of integrated circuit 2 and to pin 5 of integrated circuit 3. Pin 9 of integrated circuit 2 is connected to pin 8 of integrated circuit 4, and pin 10 of integrated circuit 4 is connected through a 20 kilo-ohm resistor R400 to the base of a transistor Q11. The emitter of transistor Q11 is grounded, and the collector is connected through a 4.7 kilo-ohm resistor R401 to the positive terminal of the 5-volt source, and through a diode D400 to terminal 10 of connector P2-B.

Pin 6 of integrated circuit 2 is connected to pin 13 of integrated circuit 4. Pin 11 of integrated circuit 4 is connected through a 200 kilo-ohm resistor R402 to the base of a transistor Q12. The emitter of transistor Q12 is grounded, and the collector is connected through a 4.7 kilo-ohm resistor R403 to the positive terminal of the 5-volt source, and through a diode D402 to terminal 11 of connector P2-B.

Terminal 24 of connector P2-B is connected to pin 6 of integrated circuit 63 and through a diode D403 to a diode D402, to pin 5 of integrated circuit 35, and through a 20 kilo-ohm resistor R403 to the positive terminal of the 5-volt source. Pin 4 of integrated circuit 63 is connected to pin 9 of integrated circuit 13, and pin 10 of integrated circuit 13 is connecged to pin 9 of integrated circuit 9. Pin 8 of integrated circuit 9 is connected through a 20 kilo-ohm resistor R404 to the base of a transistor Q6. The emitter of transistor Q6 is grounded, and the collector is connected through a 4.7 kilo-ohm resistor R404 to the positive terminal of the 5-volt source, and through a diode D405 to terminal 15 of connector P2-B.

Pin 6 of integrated circuit 35 is connected through integrated circuit 7 to a .1 microfarad capacitor C400 which, in turn, is connected to pin 3 of integrated circuit 9 and through a 20 kilo-ohm resistor to the positive terminal of the 5-volt source. Terminal 31 of connector P1 introduces the I.T. command from the keyboard encoder circuit to pin 5 of an integrated circuit U8 which may be of the type designated 4013. Terminal 10 of connector P2-B is coupled through a 0.05 microfarad capacitor C401 to pins 1, 2 and 8 of integrated circuit 15, and to a grounded 30 kilo-ohm resistor R407. Pin 9 of integrated circuit 15 is connected through a 20 kilo-ohm resistor R408 to the base of an NPN transistor Q7. The emitter of transistor Q7 is grounded, and the collector is connected through a 10 kilo-ohm resistor R409 to the positive terminal of the 5-volt source, and to terminal 15 of connector P2-B.

If the PREVIEW button 30 or 40 of the edit system of FIGS. 1 and 2 is actuated, terminal 21 is true, and the true level of terminal 21 is present at the output pin 1 of the latch formed by integrated circuit 1. This true level is presented to pins 2 and 4 of integrated circuit 2. If the operator is making an actual insert, or if the operator is previewed that insert, the video tape recorders will be rolling in the forward direction; therefore, the PREVIEW pushbutton 30 or 40 of FIG. 2 must have been actuated. So long as the output pin 1 of latch 1 remains true, the control signals from the tracks of one or the other of the video tape are fed to the clok input pin 15 of counter U53 of the circuit of FIG. 8B. When a match occurs at the output of pin 3 of comparator U37 of FIG. 8A, the match information is fed by way of terminal 10 of connector P1 to pin 5 of integrated circuit 15 of FIG. 8C, and to capacitor C401 which, as described, is connected to pins 1, 2 and 8 of integrated circuit 15.

When the PREVIEW EDIT pushbutton 30 or 40 of FIG. 2 is actuated, and as stated above, pin 1 of integrated circuit latch 1 of FIG. 8C goes high, and this high state is presented to a level of gating which enables the floating register formed by counters U48-U53 of FIG. 8B to start counting. Simultaneously, the PREVIEW command will reset the flip-flop formed by integrated circuit U8, by applying a reset signal to pin 4 of that integrated circuit. This action clears flip-flop U8 in anticipation of a clocking command received by way of terminal 24 from the editing system. When that clocking command occurs, which will be typically seconds after the commencement of the PREVIEW mode, a clock signal is presented to pin 3 of flip-flop U8 in FIG. 8C.

If insert time is delegated, the I.T. command received from terminal 31 of connector P1 will be true, so that pin 5 of flip-flop U8 will be high. The high state of pin 5 of flip-flop U8 will be clocked through to pin 1, so that pin 1 will go high. The high state of pin 1 of flip-flop U8 is introduced to pins 1 and 3 of integrated circuit 2, where it is gated with either the RECORD or PLAYBACK command, to designate which video tape recorder is to be delegated.

The resulting high state at the output pins 10 or 11 of integrated circuit 4 cause either transistor Q11 of Q13 to be conductive, and these transistors pull the record or playback CONTROL MUTE terminals 10 or 12 to ground. These CONTROL MUTE signals at terminals 10 or 12 suspend the control tracks for the duration of the insert, thereby preventing the logic within the edit system itself from proceeding and completing its normal counting operation. When the insert duration mode has ended, the control track mutes at terminals 10 or 12 are released, as pins 10 and 11 of integrated circuit 4 are high, thereby allowing the control track to continue into the edit system, thereby permitting the edit system to complete its normal preview operation.

The same action occurs during an insert operation, except that during the insert operation, terminal 5 is also pulled low by transistor Q7. During the insert operation by the edit system, the PERFORM EDIT pushbutton 40 of FIG. 2 is also depressed in addition to the PREVIEW EDIT buttons 30 and 40. Therefore, the record video tape recorder commences recording at the RECORD command on terminal 24, and continues recording until it receives an END INSERT command. The END INSERT command is received by the circuit of FIG. 8C by way of terminal 10, and is introduced to pin 5 of integrated circuit 15 and through resistance/capacitance circuit R407, C401 to pins 1, 2 and 8 of integrated circuit 15. This allows a pulse to be developed at pin 9 of integrated circuit 15 which causes Q7 to become conductive for a short interval, thereby ending the insert when a match is received, by passing an appropriate signal to the edit system by way of terminal 5.

As mentioned above, should the operator decide that the time interval in the insert register U22-U27 of FIG. 8E is not correct, he can alter the time interval in two ways. Specifically, he can re-enter the time interval by way of the keyboard, or he can trim the interval up or down until it is correct, by the operation now to be described. The trimming operation is carried out by the "+" and "−" keys of the keyboard of FIG. 4. These two keys are connected to pins 9 and 8, and 6 and 5 of integrated circuit 34 of FIG. 8F by way of terminals 40 and 37 of connector P1. When the "+" key is depressed, pins 6 and 8 of integrated circuit go low, and this action sets pin 13 of latch 6 high. This causes the up/down control pin 10 of each counter U23-U27 of the insert register to be high, so that the counters are set to an "up" count operation. Since the "+" key was actuated, this indicates that the operator wishes to extend the interval in the insert register U23-U27. At this time, pin 10 of latch 6 is also set true, which causes pin 4 of integrated circuit 64 to be set high. This enables gate 64, and permits pin 5 of integrated circuit 64 to enter data into U54, which is half the trim storage counter formed by integrated circuits U54 and U55. Pin 1 of integrated circuit U54, and pin 1 of integrated circuit U55, now go high in sequence, allowing the KBD lines to enter the operator selected key. Therefore, after the operator has actuated the "+" key, he actuates two numeral keys, the magnitude of which is loaded into the trim storage counter U54, U55. The, the operator actuates the IN- SERT key on the keyboard of FIG. 4 to commence the trim action.

When the INSERT key is actuated, terminal 46 of FIG. 8F goes low, and this action resets latch 6 on pin 12 causing pin 10 of latch 6 to go low. When that occurs, the trim register counters U54 and U55 are locked out against further keyboard entries. Simultaneously, the reset pulse is applied to pin 14 of latch 6 through capacitor C301, causing the output pin 17 of latch 6 to go low. Pin 2 of integrated circuit 35 then goes high which enables the count action to take place in counters U54 and U55.

A free-running, cross-coupled astable oscillator is formed by the circuitry of integrated circuit 35, and this oscillator produces approximately 10 KHz pulses at pin 12 of integrated circuit 35. These pulses are applied through pins 13 and 11 of integrated circuit 64 to the clock input pins 5 of counters U54 and U55. These counters are up/down decade counters, of the type designated 4510, as mentioned above. The counters are continuously strapped in the "down" direction, so that they can only count down. When the counters receive the clock pulses from the oscillator formed by integrated circuit 35, they commence the down count, the magnitude of which is determined by the previous keyboard entry. For example, had a fifteen frame trim been entered, fifteen counts would be required to count the counters U54 and U55 back to zero. When a zero count is detected, pin 7 of counter U55 resets pin 15 of latch 6, interrupting and causing a halt to the clock pulses fed to pins 15 of counters U54 and U55.

The clock pulses from the oscillator circuit of integrated circuit 35 are also routed by way of pin 13 of integrated circuit 15 in the upper right-hand corner of FIG. 8F, up to the insert register U22-U27 of FIG. 8E, so that the insert register may be counted by the number of pulses required to return the counter U54, U44 to zero. This rate multiplier technique permits scaling of the insert register U22-U27 with a minimum amount of hardware.

Should the operator select the "−" key in FIG. 4, for a minus trim, data is subtracted from the insert register U22-U37. This is accomplished by causing the "−" key to reset pin 4 of latch 6 in FIG. 4, so that pin 13 of latch 6 goes low. This action causes pin 10 of each of the counter U22-U27 of FIG. 8E to go low, causing the counters to anticipate a down count. Now, when the counters U54 and U55 of FIG. 8F are loaded with two digits by the operator, and when the trim action is initiated by depressing the INSERT key of FIG. 4, the counters U54 and U55 will still count down to zero, allowing the number of pulses required to achieve this count to be gated to the insert register U22-U27 of FIG. 8E. For this operation, however, the insert register will count down, instead of up, thus subtracting out the desired trim duration.

Another important feature of the computer of the present invention is its ability to cue either the playback video tape recorder or the record video tape recorder, as selected by the operator, back a predetermined distance. This represents a time saving feature if the operator is at the head end of an edit on one video tape recorder, and is at the tail end of the edit on the other video tape recorder. For example, if the operator had just timed the duration on the playback side, he would be at the end of the particular scene on the playback video tape recorder. However, the record video tape recorder would not even have been cued at that point.

Therefore, it is most desirable for the operator to be able to actuate only one CUE button 24 or 24 in FIG. 2, and delegate on the program computer which video tape recorder should cue back the timed interval, and cause all operations to occur automatically.

The foregoing is accomplished in the following manner. Should the operator be at the tail end of the playback video tape recorder, an INSERT DURATION would have been stored in the insert register U22-U27 of FIG. 8E. The operator now delegates the playback video tape recorder to allow him to time the duration from that video tape recorder. The actuation of the PLAYBACK key on the keyboard of FIG. 4 causes a high level to be present at terminal 36 of connector P1 in FIG. 8C, which causes pin 5 of integrated circuit 2 and pin 5 of integrated circuit 2 both to be true. Now, when the operator actuates either CUE button 24 or 34 in the tape edit unit 10 of FIG. 2, the CUE button command terminal 4 in FIG. 8C goes low. This sets pin 15 of latch 1, causing pin 1 of latch 1 to go true.

The true level of pin 1 is presented to pin 4 of integrated circuit 2, and since PLAYBACK was previously delegated, and since the INSERT LATCH pin 1 of integrated circuit U8 is true, only the playback control tracks and muted, by the conductivity of transistor Q12. Therefore, the record video tape recorder will cue back to its normal 5 second pre-roll point, and yet the playback video tape recorder will cue back the normal 5 second pre-roll time plus the additional time which is stored in the insert register U22-U27 of FIG. 8E. When a match occurs, the match storage flip-flop &8 of FIG. 8C is reset, causing the playback control track mute of transistor Q12 to go high. Therefore, the playback control tracks are now again presented to the logic within the edit system, and cue action ceases.

Likewise, had the operator been at the tail end of the record video tape recorder, and at the head end of the playback video tape recorder, a similar situation would have occurred, except that the record terminal 34, which is connected to pin 8 of integrated circuit 2, would be high; and the playback terminal 36, which is connected to pin 5 of integrated circuit 6, would be low. Therefore, transistor Q11 would cause the RECORD MUTE to occur, and the video tape edit system of FIG. 1 would cue the playback video tape recorder back its normal 5 seconds, and the record video tape recorder back the entire duration set into the insert register U22-U27 of FIG. 8E.

Should the unlikely condition occur of both the video tape recorders being at the tail end of the edit, the operator must hold both the PLAYBACK and RECORD keys of the computer keyboard of FIG. 1 down during the interval the video tape recorders are being cued. Now, both terminals 34 and 36 in FIG. 8C are true, causing both the playback and record control tracks to be muted for the entire interval stored within the insert register U22-U27 of FIG. 8E. Now, when a match occurs, both video tape recorders will have been cued back the insert duration of the insert register, and normal 5 second pre-roll cue will occur on both machines.

The logic details of the tape timing circuit of timer 21 of FIG. 3 are shown in FIG. 9. The tape timing circuit is essentially a four digit up/down counter which is used in conjunction with the display circuit of FIG. 5 to display elapsed tape time. Two identical circuits are used for the record and playback video tape recorders. The counter includes integrated up/down counter circuits U5-U9, which are of the type designated 4510. The integrated circuits U9 and U6 are decade up/down counters, and the integrated circuits U8 and U5 are permuted to count MOD6 (0-5). This yields a maximum count of 59:59. Frames are not displayed. The integrated circuit counters U5 and U8 are forced to count MOD6, by decoding the maximum up count by diodes CR30, CR31, and CR28 and CR29 respectively.

Pins 6, 11, 14 and 2 of integrated circuit U9 are connected to terminals 15, 18, 17 and 16 respectively, which, in turn, connect to driver U3 in the display circuit of FIG. 5. Likewise, pins 6, 11 and 14 of integrated circuit U8 are connected to terminals 19, 21 and 20, which are connected respectively to the driver U4 of FIG. 5. In like manner, pins 6, 11, 14 and 2 of integrated circuit U6 are connected to terminals 23, 22, 25 and 24 which connect to driver U5 of FIG. 5, and pins 6, 11 and 14 of integrated circuit U5 are connected to terminals 50, 48 and 49 respectively, which connect to driver U6 of FIG. 5.

Diodes CR28 and CR29 are connected through a 10 kilo-ohm resistor R15 to the positive terminal of the 5-volt source, and to a diode CR15. Diode CR15 is connected to pin 9 of integrated circuit U5, and to a grounded 100 kilo-ohm resistor R16. Diode CR16 is also connected to a reset button 500, which also is connected to pin 9 of integrated circuit U6, through diode CR25 to pin 9 of integrated circuit U8, and to pin 9 of integrated circuit U9.

Pin 7 of integrated circuit U6 is coupled through a 0.001 microfarad capacitor C1 to pin 11 of integrated circuit U12. The capacitor is also connected to a grounded 20 kilo-ohm resistor R2, and to a switch S1. Pin 10 of integrated circuit U12 is connected to pin 15 of integrated circuit U5, and through a diode CR20 to pin 5 of integrated circuit U5, and to a grounded 20 kilo-ohm resistor R7. Pin 7 of integrated circuit U8 is coupled through a 0.001 microfarad capacitor C10 to pin 15 of integrated circuit U7, and to a grounded 20 kilo-ohm resistor R29. Pin 5 of integrated circuit U7 is also connected to a switch S2. Pin 6 of integrated circuit U7 is connected through diode CR21 to pin 15 of integrated circuit U6 and to diode CR23. Diode CR23 is connected to pin 5 of integrated circuit U6 and to a grounded 47 kilo-ohm resistor R18.

Pin 9 of integrated circuit U8 is connected to a grounded 20 kilo-ohm resistor R22, to diode CR25, and to a diode CR24. Diode CR24 is connected to pin 10 of integrated circuit U7, and to a grounded 0.001 microfarad capacitor C9. Integrated circuit U7 may be of the type designated 74C04. Pins 11 and 14 of integrated circuit U8 are connected through respective diodes CR31 and CR30 to pin 13 of integrated circuit U7, and through a 20 kilo-ohm resistor R23 to the positive terminal of the 5-volt source. Pin 12 of integrated circuit U7 is connected to a diode CR22 and to pin 11 of integrated circuit U7. Diodes CR21, CR22 and CR23 are all connected through a 6.8 kilo-ohm resistor R21 to the positive terminal of the 5-volt source.

Pin 7 of integrated circuit U9 is coupled through a 0.001 microfarad capacitor C11 to a 20 kilo-ohm resistor R30, to pin 1 of integrated circuit U7, and to a switch S3. Pin 2 of integrated circuit U7 is connected to pin 15 of integrated circuit U8, and through a diode CR26 to pin 5 of integrated circuit U8, and to a grounded 20 kilo-ohm resistor R24. Pin 15 of integrated circuit U9 is connected through diode CR27 to a 20 kilo-ohm resistor R26, and to pin 5 of integrated circuit U9.

Input terminal 2 of FIG. 9 is connected to a diode CR10, and through a 10 kilo-ohm resistor R13 to the positive terminal of the 5-volt source. Diode CR10 is connected to diode CR18, to diode CR9 and through a 10 kilo-ohm resistor R11 to the positive terminal of the 5-volt source. Diode CR9 is connected to pin 14 of an integrated circuit U10, which may be of the type designated 4022. Pin 15 of integrated circuit U10 is connected to a diode CR1, and through a diode CR21 to terminal 7, which in turn is connected to reset button 500. The terminal 7 is also connected to pin 15 of an integrated circuit U11, which may be of the type designated 4017. Pin 11 of integrated circuit U11 is coupled through a 0.001 microfarad capacitor C2 to a grounded 20 kilo-ohm resistor R3, and to switch S4. Capacitor C2 is also connected to pin 13 of an integrated circuit U12, which may be of the type designated 74C04. Pin 13 of integrated circuit U12 is connected to pin 15 of integrated circuit U9. Pin 8 of integrated circuit U7 is connected to pin 1 of integrated circuit U12, and pin 2 of integrated circuit U12 is connected to pin 3 of integrated circuit U7 and to a 10 microfarad capacitor C9. Integrated circuit U7 may be of the type designated 74C04, as may integrated circuit U12. Pin 4 of integrated circuit U7 is connected to switch S4, and through a 47 kilo-ohm resistor R20 to a 10 microfarad capacitor C10. Capacitor C10 is connected to capacitor C9. Resistor R20 is also connected to a 68 kilo-ohm resistor R19, which is connected back to pin 9 of integrated circuit U7.

Terminal 3 of timing circuit of FIG. 9 is connected to a diode CR13 which, in turn, is connected through a 6.8 kilo-ohm resistor R14 to the positive terminal of the 5-volt source. Terminal 3 is also connected through a diode CR14 to diodes CR7 and CR11, to a grounded 10 kilo-ohm resistor R8, and to a grounded 0.001 microfarad capacitor C3. Terminal 10 is connected to diode CR11 and through diode CR12 and a 6.8 kilo-ohm resistor R9 to the positive terminal of the 5-volt source. Diode CR7 is connected to pin 5 of integrated circuit U12 which, as stated, may be of the type designated 74C04, and through a 68 kilo-ohm resistor R6 to the positive terminal of the 5-volt source. Diode CR7 is also connected through diode CR6 to pin 8 of integrated circuit U12.

Terminal 9 of the timing circuit of FIG. 9 is connected through a diode CR18 to a grounded 3.3 microfarad capacitor C4 and to a diode CR20. Diode CR20 is connected thorugh a 20 kilo-ohm resistor R7 to the positive terminal of the 5-volt source, and to a diode CR5, and to pin 9 of integrated circuit U12. Diode CR5 is connected to pin 6 of integrated circuit U12, and through a diode CR2 to a pair of diodes CR2 and CR4, and through a 10 kilo-ohm resistor R4 to the positive terminal of the 5-volt source. Diode CR3 is connected to diode CR9, and to a grounded 68 kilo-ohm resistor R5.

Terminal 4 is connected to a grounded 1 microfarad capacitor C6, and through a 2.2 kilo-ohm resistor R12 to the junction of a pair of diodes CR18 and CR17. Diode CR18 is connected to the positive terminal of the 5-volt source, and diode CR17 is connected to ground. Resistor R12 is also connected to a grounded 0.10 microfarad capacitor C8, and thorugh a 20 kilo-ohm resistor R10. Resistor R10 is connected to pin 3 of integrated circuit U12.

A feature of the timing circuit of FIG. 9 is in the ability to preset any count the operator requires into any decade. This permits the operator to remove a tape, and later to reinsert the tape, and preset the tape time to where he left off. This is accomplished by gating the slow clock (SLOCL) to the appropriate counter through the pushbutton switches S1-S4.

Since in normal timing operation, the counters must go up when the tape moves in the forward direction, and down when the tape moves in the reverse direction, and up/down signal is generated from terminal 8 to make the count decrement. Control tracks from the video tape recorder are divided by six and ten to yield one pulse per second for the display counters U5-U9. This is achieved by the integrated circuit U10. The integrated circuit U10 may also be connected for 60Hz operation by internal jumpers J1 and J2.

Since the record video tape recorder produces no control tracks during an ASSEMBLE mode, these must be synthesized. The 60Hz line signal at terminal 4 is conditioned and shaped by capacitor C6, resistor R12, resistor R10, capacitor C8, diodes CR17 and CR18, and by the adjacent integrated circuit U12. These pulses replace the control tracks at pin 14 of integrated circuit U10, in the ASSEMBLE mode. This action is controlled by cross-couple gates U12, pins 5, 6, 9, 8. In the edit (assemble) mode the resulting flip-flop is set to disconnect the control tracks, by way of diode CR8, and replace them with 60Hz pulses by way of diode CR3. When the assemble is completed, the "END ASSEMBLE" command at terminal 9 clears the flip-flop, and restores normal control tracks.

The invention provides, therefore, a computer for use with a video tape editing system, for performing the functions described above, and to provide desirable automatic controls for the editing system. It will be appreciated that while a particular embodiment of the invention has been shown and described, modifications may be made. It is intended in the claims to cover the modifications which come within the spirit and scope of the invention.

What is claimed is:

1. In combination with a video tape editing system for transferring selected video information from a first video tape in a playback video tape recorder to a second video tape in a record video tape recorder, said video tape editing system being controllable to establish a start insert time with respect to the video information transferred from the first video tape to the second video tape, the first and second tapes each having frame-indicating control pulses recorded thereon; a counter circuit connected to said editing system and responsive to the control pulses for producing digital time signals; and a computer connected to the tape editing system and to the counter circuit, said computer including, a digital display circuit, a keyboard, encoding circuitry connected to said keyboard, and logic circuitry connected to said encoding circuitry and to said display circuit to cause the computer to provide an end insert time to the editing system as established by a predetermined time value set up in the display circuit by operation of the keyboard.

2. The combination defined in claim 1, and which includes further circuitry connected to said logic circuitry, and manual control means connected to said further circuitry to enable an operator to preview the start insert and end insert edit points before an actual edit is made.

3. The combination defined in claim 1, and which includes further circuitry connected to said logic circuitry to provide a digital stop watch function whereby said display provides scene duration timing for either said playback or said record video tape recorder as established by a predetermined time value set up in the display circuit by operation of the keyboard.

4. The combination defined in claim 1, and which includes further circuitry connected to said logic circuitry to provide a tape search function for either said playback or said record video tape recorder, as established by a number representing a predetermined tape location set up in the display circuit by operation of the keyboard.

5. The combination defined in claim 4, in which said further circuitry includes circuit means to render the tape search function bi-directional.

6. The combination defined in claim 1, in which the keyboard includes a plurality of numeral keys by which time-indicating digits may be entered into the display circuit.

7. The combination defined in claim 3, in which the editing system includes first manually operable switching means connected to said further circuitry to initiate motion of the tape in a selected one of the video tape recorders and to start the timing indication in the display circuit, and in which the editing system includes a second manually operable switching means connected to said further circuitry to stop the tape motion and to stop the timing indication in the display circuit, so that the display exhibits the elapsed time from start to stop.

8. The combination defined in claim 1, and which includes further circuitry connected to said logic circuitry to provide cue controls for the first and second tapes in the video tape recorder to establish the tapes at selected relative positions prior to an in and out editing operation.

9. The combination defined in claim 1, and which includes further circuitry connected to said logic circuitry to enable an operator to trim the insert duration, upon operation of the keyboard.

10. The combination defined in claim 9, in which said keyboard includes a plurality of numeral keys operable to establish the number of frames to be trimmed, and two additional keys individually operable to determine whether the insert duration is to be lengthened or shortened during a trim operation.

11. The combination defined in claim 4, in which said keyboard includes a plurality of numeral keys operable to establish the location of a desired frame on the first or second tape, and to display a number corresponding to the desired frame on the display.

* * * * *